United States Patent [19]

Cerkanowicz et al.

[11] Patent Number: 4,622,119

[45] Date of Patent: Nov. 11, 1986

[54] METHOD OF PROMOTING NUCLEATION OF SOLUTE IN A SOLUTION

[75] Inventors: Anthony E. Cerkanowicz, Livingston; Irving D. Crane, Randolph; Brian P. Flannery, Clinton; Robert J. L. Chimenti, Short Hills, N.J.

[73] Assignee: Exxon Research and Engineering Company, Florham Park, N.J.

[21] Appl. No.: 722,107

[22] Filed: Apr. 11, 1985

[51] Int. Cl.[4] .................... B03C 5/00; B03C 5/02; C10G 33/02
[52] U.S. Cl. .................... 204/190; 204/188; 204/186; 204/302; 204/308
[58] Field of Search ............... 204/189, 190, 186, 188, 204/168, 302, 308; 210/748, 243

[56] References Cited

U.S. PATENT DOCUMENTS

| | | | |
|---|---|---|---|
| 2,054,273 | 9/1936 | Subkow | 204/300 |
| 2,060,839 | 11/1936 | Waterman | 204/188 |
| 2,061,197 | 11/1936 | Kiech | 204/188 |
| 3,129,157 | 4/1964 | Lockenhoff | 204/299 |
| 3,412,002 | 11/1968 | Hubby | 204/188 |
| 3,489,669 | 1/1970 | Ruhnke | 204/186 |
| 3,567,619 | 3/1971 | Brown | 204/188 |
| 3,616,460 | 10/1971 | Watson et al. | 204/188 |
| 4,139,441 | 2/1979 | Bose | 204/191 |
| 4,194,956 | 3/1980 | Seguine | 204/186 |
| 4,200,509 | 4/1980 | Seguine | 204/186 |
| 4,435,261 | 3/1984 | Mintz et al. | 204/168 |

Primary Examiner—Howard S. Williams
Attorney, Agent, or Firm—Jay Simon

[57] ABSTRACT

To promote nucleation of a solute in a solution (e.g. wax dissolved in lubricating oil), free excess charge which is net unipolar is introduced into the solution, for example by charge injection, and the solubility for the solute is reduced (for example by cooling), at least until nucleation of the solution takes place. Nucleation is the physical mechanism which leads to precipitation of the solute and so this method can be applied for the electrical pretreatment of the solution to produce a precipitate, following which the precipitate can be removed from the solvent by conventional separation techniques or be present to provide desired physical or chemical characteristics. An alternative method is to reduce the solubility of the solute in the solution almost to the point of nucleation, and only then to introduce the free excess charge so as to precipitate the onset of nucleation.

50 Claims, 13 Drawing Figures

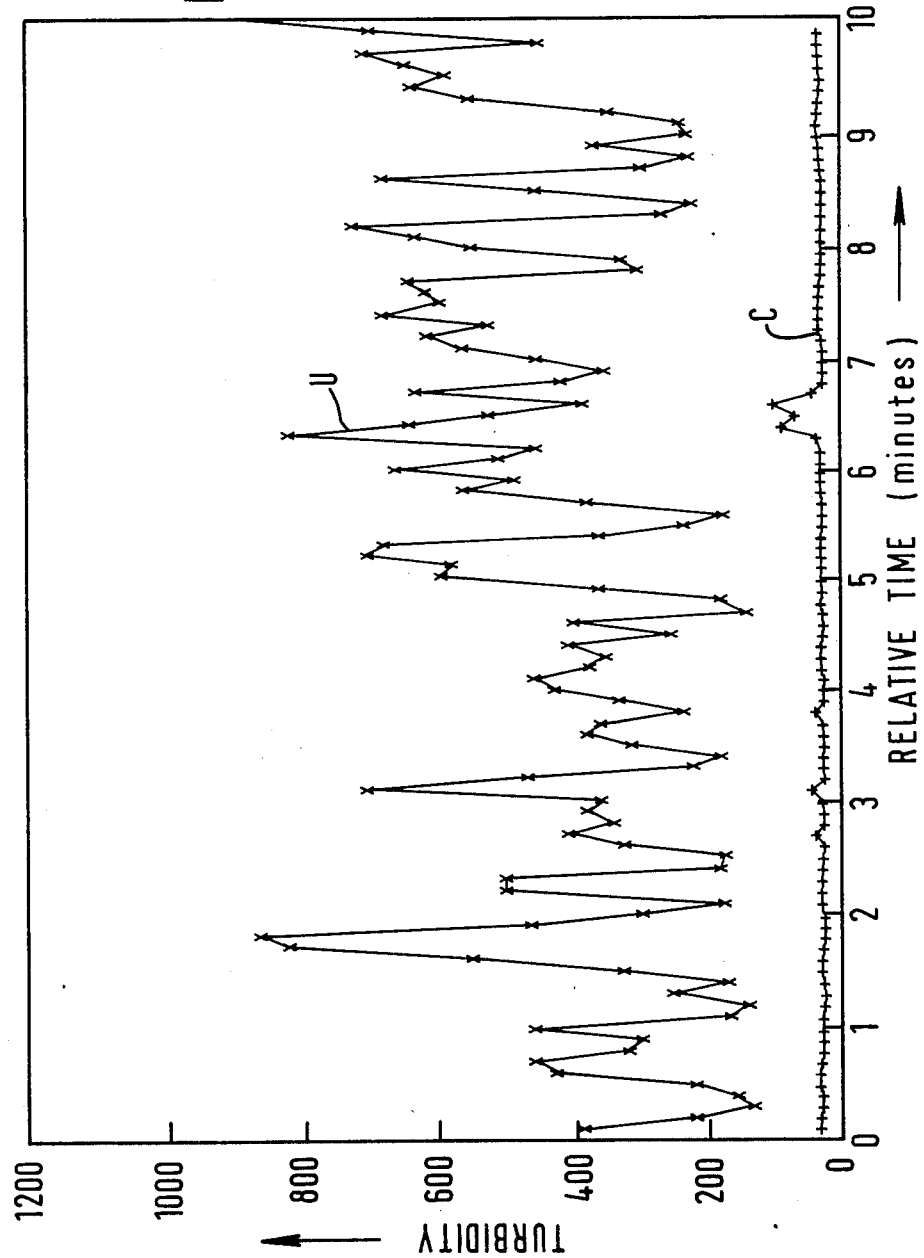

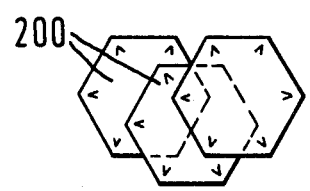 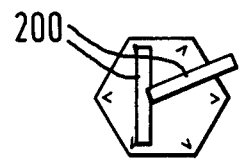
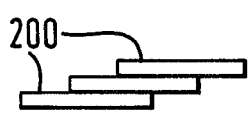 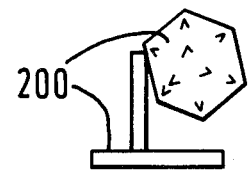
FIG. 12.                    FIG. 13.

METHOD OF PROMOTING NUCLEATION OF SOLUTE IN A SOLUTION

CROSS-REFERENCE TO RELATED APPLICATIONS

The specification of this application refers to other applications of the present assignees filed on the same day as the present application and bearing the undermentioned assignee case references:
U.S. Ser. No. 722,163, filed 4-11-85
U.S. Ser. No. 722,162, filed 4-11-85
U.S. Ser. No. 722,160, filed 4-11-85.

BACKGROUND OF THE INVENTION

This invention relates to promoting nucleation of solute in a solution, and in particular, though not exclusively, to the separation of dissolved wax from hydrocarbon oil mixture boiling in the lubricating oil range. In this specification, "solute" means a liquid or solid dissolved in a solvent.

One area of particular interest as far as the invention is concerned is the separation of a solute from the solvent in which it is dissolved. The problems of wax in lubricating oil are very well known in the art. In the distillation of crude oil, a proportion of wax is present in cuts taken in the lubricating oil range. Some of the wax remains dissolved in the oil, whereas other fractions form a haze as the oil fraction ages at ambient temperatures. Wax in itself is in fact a good lubricant but under comparatively low temperatures such as engine cold start conditions, its presence causes the oil to be thick and viscous and as a result the engine may be hard to turn over at sufficient speed during starting. Haze manifests itself as a milky or cloudy appearance in the oil and is often caused by wax or by both wax and tiny water droplets being present in the lubricating oil. Typically a minimum of about 0.1% by volume of wax will cause some lubricating oils to look hazy. Therefore the existence of haze caused by the presence of wax crystals or particles detrimentally affects the performance of lubricating oils. It is of paramount practical importance to devise techniques for removing dissolved was from lubricating oil in a relatively inexpensive, simple and effective manner, which techniques are also capable of implementation on an industrial scale. A second area of interest as far as the invention is concerned is the extraction of a polar liquid dissolved in a non-polar liquid. An example is a residium which may be entrained and dissolved by a distillation process into a largely non-polar distillate fraction. In addition, the separation of other solutes than dissolved wax or residuum from solvent liquids generally is of practical importance and finds application throughout the petroleum and chemical industries.

It is well known that in some cases, for separating a solute from the solvent in which it is dissolved, the solution can be cooled sufficiently so that the solute is converted into a precipitate which can then be removed from the solvent in any suitable manner. In the case of a dissolved liquid, when the solution temperature is reduced below the dissolution point for that liquid, the dissolved liquid precipitates as a second liquid phase distinct from the solvent phase. For a dissolved solid, a precipitate is formed when the solution temperature falls below a critical temperature such as the melting temperature or the crystallization temperature of that solid in the solvent used. One way in which the precipitate can be separated from the solvent is to pass the precipitate-laden solvent through a filter medium or filter screen, but for this technique to be effective, the average particle size of the precipitate needs to be sufficient, such that the major proportion of the precipitate is restrained by the filter. In the case of dissolved wax in lubricating oil, in order to promote the precipitation of wax particles, an oil solvent is generally added to the wax-bearing lubricating oil (hydrocarbon oil mixture boiling in the lubricating oil range). "Oil solvent" as used throughout this specification refers to those solvents which when added to an oil mixture result in a lower viscosity for the solvent-oil mixture than for the oil mixture alone. This is beneficial for enhancing the settling or filtration processes used to separate the precipitated wax from the solvent oil mixture. Usually, the oil solvent will have the additional property of having a higher solubility for the oil mixture than for the wax at any given temperature, so that during chilling of the solvent-oil mixture to precipitate wax, the wax precipitation is enhanced. However, the resulting wax particles usually have a very small mean diameter (e.g. 0.1 to 100 microns) and special rotary drum filters have to be used, employing a filter cloth which extends around the drum periphery and through which the wax precipitate-bearing lube oil/solvent mixture is drawn under suction to form a wax deposit or cake on the filter cloth. Since the rate of filtration is directly related to the viscosity of the lube oil/oil solvent mixture, which is lower than that of the lube oil alone, the filtration rate is enhanced. Furthermore, it is known to use a vaporizable oil solvent liquid, such as liquified propane, and to allow the solvent liquid to vaporize from the lube oil so as to induce at least part of the overall chilling of the oil which brings about precipitation of the wax. However, the filterability of the resulting wax particles is inversely related to the rate of cooling so that in practice, the cooling, whether produced by the auto-refrigeration effect of vaporizing propane or other vaporizable oil solvent or in some other way such as by indirect heat exchange with a cooling medium, has to be effected at a controlled, slow rate, in order that the downstream rotary drum filter or other filter unit is able to separate the wax precipitate from the lube oil. This results in increasing treatment time in a lube oil dewaxing plant and added technical complexity.

It is also known that, in general, the mechanism of precipitation of a solute in a solvent is initiated by nucleation of the solute as the solubility for the solute is reduced. Nucleation is the formation of nuclei which themselves, when grown to a critical size, will act as sites at which agglomeration and crystallization occurs to convert the solute into crystals or particles forming the precipitate. Therefore, the onset of nucleation is critical to the precipitation of the solute in the solvent. It follows that a need exists for a method of promoting nucleation of a solute, which can lead to enhanced precipitation of the solute. Furthermore, a method for changing the nucleating mechanism, in particular the critical nucleation size, number density, nucleation rate, growth rate following nucleation and morphology of the precipitating species, can have important practical applications, not only in dissolved solid or liquid separation but also in crystal morphology.

DESCRIPTION OF THE PRIOR ART

Techniques have been available for many years which enable dispersed particles or dispersed droplets in a continuous background phase to be removed from that continuous phase. Some techniques have been specially devised for separating wax from oil. One broad category of separators is electrofilters. In many known electrofilters, the electrofiltration process results in agglomeration or coalescence of the dispersed particles or droplets to form larger agglomerates which can then be more readily separated from the continuous phase.

U.S. Pat. No. 1,940,654 (Stanton) discloses a petroleum dewaxing technique based on electrophoresis, for removal of suspended solid wax particles. Two possible mechanisms are described by which the technique imparts charge to the wax crystals, i.e. direct contact charging and charging by passing the crystals through a glow or brush discharge (comprising bipolar gas-phase ions). Stanton recognises that a high voltage alternating electrostatic field has a coalescing or agglomerating effect upon solid wax particles suspended in petroleum oil.

U.S. Pat. No. 4,341,617 (King) uses sharply pointed projections on one electrode of a pair of oppositely charged electrodes associated with a treating chamber in an electrostatic treater for waste liquid to be discharged into municipal sewage systems, to concentrate the electric field at the projection tips for encouraging flocculation of impurity particles carried by the waste liquid. In another arrangement, the electrode tips inject charge carriers into the waste liquid and a resulting electrical current flow is established through the waste liquid between the two electrodes. The net positive charge due to the flow of positive ions in one direction exactly equals the net negative charge due to the flow of negative ions in the opposite direction. King does not mention any application to separating wax from lube oil.

Reference is also directed to U.S. Pat. No. 3,324,026 (Waterman et al) which discloses an electric filter for removing suspended contaminants from substantially water-free, high resistivity oils. The contaminanted oil is flowed through the pores of individual elements of porous material forming a multi-element mass filling a treating space between two electrodes which maintain a high gradient unidirectional electric field in the treating space. Before the oil is passed through the multi-element mass, it may be subjected to electrical discharge or blast action by a plurality of relatively sharp pointed pins of one polarity facing but spaced from a member of opposite polarity.

Each of U.S. Pat. Nos. 2,039,636 (Dillon et al); 2,053,552 (Dillon et al); 2,067,162 (Fisher et al); 2,151,318 (Dillon et al); and 2,174,938 (Dillon et al) is concerned with electrofiltration of wax-bearing oil using an electrical treater in which an electric field is applied between two electrodes. As a result some wax is deposited on the electrodes while the remaining wax is agglomerated. The thus treated wax precipitate is in a form which can be much more readily settled or otherwise separated, such as by filtration or centrifuging. These patents address the problem that amorphous and/or micro-crystalline wax are extremely difficult and impracticable to separate by previously known filtration methods. In these patents, the wax-bearing oil is mixed with an oil solvent diluent, chilled to a temperature at which wax precipitates from solution and the resulting mixture of wax-bearing oil, diluent and precipitated wax subjected to the electrical treatment.

It is also known from U.S. Pat. No. 4,255,777 (Kelly), assigned to the present assignees, to inject charge into a liquid. This patent specifically discloses an electrostatic atomizing device and process for the formation of electrostatically charged droplets having an average diameter of less than about 1 millimeter for a liquid having a low electrical conductivity. Envisaged applications of the electrostatic atomizing technique are for spraying cleaning fluid onto the surface of an article to be cleaned, for spraying agricultural liquid, such as an insecticide, onto vegetation or soil, for spraying lubricant onto bearings and gears of large industrial machinery, for surface coating an article by spraying a solution of a plastic dissolved in a non-conductive liquid or an oil-based point, to inject free excess charge into a molten plastic, glass or ceramic, and for spraying liquified plastic material for forming surface coatings. Another possible application is to produce charged droplets of liquid e.g. paint within a body of the same liquid which is in contact with a metal surface, so that the charged droplets deposit as a coating on the metal surface. Charged droplets of for example perfume could be sprayed onto oppositely charged powder e.g. talcum powder. Yet another application is the atomization of hydrocarbon fuels, for increasing combustion efficiency. However, the Kelly patent neither discloses nor suggests trying to charge a two-phase liquid comprising dispersed or suspended droplets or particles (such as wax) in a continuous liquid phase (such as lubricating oil), nor appreciates that the charge, introduced into the continuous liquid phase, transfers therefrom to the dispersed phase and that an electrophoretic effect occurs which causes migration of the dispersed phase in the continuous liquid phase, nor even suggests any kind of application to electrical separation.

Finally, reference is directed to U.S. Pat. No. 4,435,261 (Mintz et al), assigned to the present assignees, which discloses a technique for the free radical polymerization of liquid monomers to thermoplastic polymers. Free excess electrical charge is injected into the liquid monomer, so as to initiate polymerization of the monomer into a polymer.

SUMMARY OF THE INVENTION

The present invention is concerned with promoting nucleation of a solute dissolved in a solvent to form a solution. The solute comprises a solid or liquid dissolved in the solvent, which itself is a liquid. The method of the present invention requires that two steps be carried out. One step is to introduce free excess charge which is net unipolar into the solution. Free excess charge is positive or negative ions which, initially, are free to move through the solution. The solution acts as a medium through which volumetric distribution of the introduced charge occurs. The other step is to reduce the solubility of the solute in the solvent. The invention further requires that at least one of these steps must be carried out at least until nucleation of the solute occurs in the charged solution. Usually, both steps will be continuously carried out simultaneously. Where the solubility reduction is achieved by for example cooling the solution, the cooling will cause the temperature of the solution to fall progressively until, at a critical temperature dependent upon the level of introduced free excess charge, the onset of nucleation will occur. Another possibility is to reduce the solubility of the solution, initially without introduction of free excess charge, to a solubility just above that at which, in the absence of free excess charge introduction, nucleation would be initiated. Then, with or without further solubility reduction, free excess charge is introduced into the solution and providing the charge level is adequate, nucleation will start to occur. In principle, the converse situation is possible, namely to charge the solution with free excess charge, with or without a solubility reduction, and then to complete the solubility reduction, in the absence of any further introduction of free excess charge, to a point at which onset of nucleation occurs. One practical difficulty with this particular possibility is that once no further free excess charge is introduced, the free excess charge in the solution will tend to leak to earth and it would then be necessary for the solubility reduction of the solution to be sufficiently rapid that nucleation has taken place before a significant proportion of the charge has leaked away. In practice, this result may be difficult to achieve with many solutions. However, where for example the introduced charge has a pulsed periodic waveform of relatively high frequency comprising a pulse of one polarity and a zero amplitude portion over each cycle of the waveform, then nucleation of the solute is believed to be promoted even when a zero amplitude portion of the waveform coincides with the initiation of nucleation.

It is to be noted that in each of the aforesaid Dillon and Fisher patents, in contra-distinction to the present invention, the wax-bearing oil is firstly chilled in the presence of the diluent, so that the wax precipitates from solution, and only then is subjected to the electrical treatment, which in any event does not in itself involve introduction of free excess charge.

In regard to the introduction of free excess charge, several techniques are available to produce a transient or steady-excess charge density. Broadly speaking, such methods fall into two general categories, namely: (1) injection of excess charge across the interface or boundary which confines the solution and (2) volumetric charge introduction techniques into the bulk of the solution. Examples of the first category include electron beam and high energy particle radiation, photo-emission and charge transport by a moving fluid. Reference is hereby directed to the aforesaid Kelly U.S. Pat. No. 4,255,777, the contents of which are expressly incorporated herein, for a description of one example of how charge injection can be achieved, solely or predominantly by field emission. Field emission, electron beam irradiation and photo-emission are all examples of electron emission. Examples of the second category are photoionization of either or both of the solute and solvent and secondary ionization by thermalization of high energy particle irradiation of the solution. These examples all involve ionic dissociation within the solution.

It is necessary that there be an excess of free charge in the solution in the sense of a sufficient abundance that nucleation is promoted. Typically, the density of the free charge would be of the order of $10^{16}$ charges per $m^3$. A lower limit would be about $1 \times 10^{10}$ charges per $m^3$. A typical preferred range of free charge density is about $1 \times 10^{13}$ to $1 \times 10^{19}$ charges per $m^3$ or even higher, for providing effective promotion of nucleation.

The charge introduced into any solution stream to be treated must be net negative or net positive. However, providing this requirement is met, then it is equally possible to introduce the excess charge using two streams of the same solution of opposite but unequal levels of charge or alternating net positive and net negative streams.

It is stressed that the electric field is not an applied field resulting from the application of voltage between a pair of electrodes, but rather arises from the total introduced or injected charge distribution in the solution.

In the present invention, the inventors believe that the presence of the free excess charge acts on a nucleating species to create stress or pressure at the nucleation surface as well as to create motion of the species involved, thus altering the microphysical processes which occur. The motion arises due to the fact that the excess charge, volumetrically distributed in the solution, will generate an induced electric field in the solution which interacts with the charge, resulting in movement of the charge toward outer boundaries of the bulk solution. Some of the charge will be intercepted by and remain with "charge trapping" molecules or second phase inclusions. As a result, these species will become charged and then forced to begin moving within the solution. A means of draining charge from the solution may be included to control overall charge level and charge distribution. A grounded wire or network of wires with a selectable resistance to ground would provide a grid electrode for achieving such control.

Various techniques exist for effecting the required reduction in the solubility or the solute in the solvent. A preferred technique, referred to briefly in the preceding paragraph, is to cool the solution. An area of considerable practical importance is the nucleation and precipitation of dissolved wax in lube oil, for example in a wax separation process. Cooling the waxy lube oil will result in wax nucleation and precipitation. An alternative or additional technique is to add a liquid additive to the solution to form an admixture, the liquid additive having the property of preferentially dissolving the solvent so as to allow the solute to precipitate as the solution is cooled. Suitably, the liquid additive is a vaporizable liquid which vaporizes from the liquid additive/solution admixture so as to produce the required cooling of the solution, at least in part. One possibility is to add more solute, whereas another is to add a second solvent which has a lower solubility for the solute than the first solvent. A preferred application of the invention is the separation of dissolved wax from a hydrocarbon oil mixture boiling in the lubricating oil range. In that case, the vaporizable liquid additive can be liquified propane or other oil solvent such as any alkane or alkene whose molecular weight is between 16 and 114, or any other oil solvent whose electrical conductivity is less than about $10^{-8}$ $(ohm.m)^{-1}$. Another preferred method would be to cool a mixture of, say, propane and waxy oil to its cloud point, then inject charge to promote further nucleation of wax and add a second solvent, say methyl ethyl ketone (MEK), to the propane/oil/wax solution, which second solvent lowers the solubility of the wax in the solution. The MEK will cause wax to precipitate as wax particles with no further cooling. Alternatively, or in addition, to the use of a vaporizable oil solvent, the cooling may be effected by indirect heat exchange with a cooling medium.

Other ways exist to alter the solubility of the solute in the solvent so as to cause nucleation and precipitation of the solute as a second phase. One example in the area of lubricating oil containing dissolved wax is the addition to the oil/solvent mixture (i.e. the mixture of lube oil and oil solvent) of an additive to alter the chemical or physical state of the solvent by chemical reaction between the additive and solvent or, where the additive is a solvent absorber, by the selective absorption of the solvent by the additive. A second example is to utilize the disparity in vapor pressures between the solvent and solute such as by venting, drawing vacuum, heating (in the case that both the solvent and the solute have a low vapor pressure), and, again in the lubricating oil field, selective removal of the solvent vapor from the gas or vapor atmosphere above a body of the oil/solvent mixture.

If the solute is chemically dissimilar to the solvent (e.g., a dissolved polar solute and a non-polar solvent), then introduced free excess charge migrating through the solution will experience a larger affinity for attachment to the polar solvent. Therefore, free excess charge introduction into a solution comprising a dissolved polar solute in a non-polar solution is effective to promote nucleation and precipitation of the polar solute. Where, however, the solvent and solute are chemically similar (as in the case of wax dissolved in lube oil, for example), introduced free excess charge may have an approximately equal affinity for both the solute and the solvent and therefore may not be expected to have an appreciable effect on promoting nucleation and precipitation of the dissolved solute. In order to impart a greater affinity for free excess charge to the solute than the solvent in this case, a liquid additive may be added having the property that it preferentially combines chemically or physically with the solute while providing an affinity for the free excess charge. For example, the additive may comprise "charge trapping" molecules which chemically react preferentially with the solute (that is the species which is to nucleate and precipitate), and provides the solute with a greater affinity for free excess charge than is otherwise established by the solute. In the case of wax dissolved in lube oil, the wax and lube oil are chemically similar but have differing molecular weights. To facilitate nucleation and precipitation of the dissolved wax, an additive may be used such as a high molecular weight hydrocarbon, containing an amine group.

The inventors believe that the effect of the charge on the nucleation process may be understood from a fundamental point of view by realizing that the interaction of solute molecules or clusters of solute molecules are normally short range; that is to say, the solute molecules or clusters interact as simple uncharged spheres unless their separation is of molecular dimensions. Under given conditions of thermodynamic variables (such as pressure and temperature) the average rate of collisions of solute molecules will be governed by the strength of these interactions. Statistically, within the volume at any instant of time, there will be a distribution of the number of solute molecules in collision (i.e., $N_o$ binary collisions, $N_1$ ternary collisions, . . . ). When a critical number of molecules or clusters collide the energy of the interaction changes such that if a number greater than the critical number collide, the collision complex is stable and grows while if a number less than the critical number collide, the collision complex is unstable and dissociates. The size of this collision complex is called the critical size for nucleation.

If one or more of the colliding species is charged, then the interaction is more long range and greater in strength. Therefore, the rate and energy of interaction of molecules or clusters below the critical size (as obtained with no free excess charge added) is increased and the overall rate of nucleation is enhanced. In fact, the critical size for nucleation is reduced.

The inventors further believe that charge deposition on substantial nuclei directly alters the energy of the cluster as can be seen by considering a model that has been developed for liquid nucleation from a gas phase. This model relates the rate of nucleation to the equilibrium concentration of clusters which are at a critical size corresponding to a condition of minimum free energy. Any further addition of species to this critical embryo results in a free energy decrease with an attendant high probability of growth to macroscopic size. Viewing the nucleus as a spherical liquid drop, classical theory relates the free energy of formation to the macroscopic surface tension of the bulk solvent and its volume-free energy. Although this model breaks down if the critical nucleus contains only a few molecules, it provides a first description of the nucleation process. It terms of the macroscopic surface tension ($\sigma$) of the bulk liquids the critical nucleus size ($r_c$), number density ($n_c$), and nucleation rate ($R_c$) can be expressed as follows:

$$r_c \sim \sigma \tag{1}$$

$$n_c \sim \sigma^3 \tag{2}$$

$$R_c \sim \sigma^{3/2} \exp(-A\sigma^3) \tag{3},$$

where A is a constant. The effect of free charge can be modelled by its influence on the surface tension, $\sigma$, of the solvent as follows $$\sigma = \sigma_o - Q_s^2/(8\pi)^2 \epsilon_o r^3 \tag{4}$$

where $\sigma_o$=surface tension of an unchanged spherical drop
  $Q_s$=surface charge of drop
  r=drop radius
  $\epsilon_O$=permittivity of free space The effect of free charge of either sign results in a reduction of surface tension (this effect can be dramatic to the point of drop disruption when the net surface tension becomes zero). A small change in surface tension very strongly influences the nucleation rate as well as altering the critical embryo size and number density. For example, calculations show that in some cases a 10% change in can result in a ten order of magnitude change in nucleation rate.

If the growth rates is limited by the rate at which nucleating phase diffuses to the nucleus, then nucleation and growth will also be influenced by movement of the nucleus through the liquid. The movement will reduce the diffusional growth rate limitation by altering the concentration gradient boundary layer surrounding the growing phase. Electrohydrodynamically induced motion due to the presence of the free excess charge may provide the necessary convective motion of the nucleus to reduce the diffusion limitation.

Charge induced movement will also promote growth by increasing the probability for collision between nucleated species. Movement of charged species will depend on the forces due to the species charge level and the opposing forces of viscous drag. Since nucleated species will have different charge levels and radii, a distribution of velocities is expected. The probability of collisional growth by nuclei impaction (even in the presence of charge of one sign) will be significantly increased. Collisional growth rate will also be further promoted by the re-entrainment of nucleated species from a charge dissipating surface (such as the grid electrode mentioned above) which acts as a source of neutralized species. The neutralized species will not experience any direct force due to the charge-generated field until they again accumulate charge. In the meantime they will be concentrated near the charge-dissipating surface and will increase the probability for collision, with a charged species moving toward this surface.

Nuclei and precipitate morphology would be influenced by charge deposition on the growing phase. Charged crystals, for example, would be subjected to interaction forces that would cause specific orientations to occur and prevent other orientations prior to collisional growth or fusion of adjacent crystals. Charged sites would also act like crystal dislocations, thus forcing an alteration in depositional growth from that normally experienced in the absence of charge. Essentially, two-dimensional growth patterns could, for example, be forced to become more three-dimensional in nature.

In applying the method to the separation of the solute from the solvent, the method is continued beyond the point at which nucleation of the solute takes place and lasts until the solute is converted into a dispersed phase or precipitate in the solvent. The precipitate can then be separated by suitable separation techniques such as gravity settling or filtration using a filter screen or filter medium.

When injecting free excess charge, injection can be effected into a stream of the solution which is then added to a body of the solution, which is for example contained in a vessel. However, to reduce charge dissipation and assist charge injection efficiency, the stream may be directed through a gas or vapor space before entering into or accumulating on the body of solution in the container vessel, thereby decoupling the charge injection from the vessel where nucleation takes place. The gas or vapor space may be vented to the atmosphere or, where the composition of the stream is such as to present risk of explosion or undesirable chemical reaction in the presence of air, the gas or vapor space may be purged with an inert purge gas, e.g. nitrogen. In the case of wax-bearing lubricating oil, propane diluent can be allowed to vaporize and the propane vapor can serve to purge the gas or vapor space. An alternative approach is to inject the charge into a carrier liquid which is then added to a body of solution in a separation vessel, in which charge transfers from the carrier liquid to the solution in the separation vessel. The carrier liquid needs to be chemically non-reactive with the solution and also recoverable from the solution. For removal of dissolved wax from lube oil, the carrier liquid could be liquified propane for example.

A preferred method of performing the invention provides a method of promoting nucleation of wax dissolved in a hydrocarbon oil mixture boiling in the lubricating oil range, comprising the steps of recycling a quantity of said oil mixture around a closed circuit, continuously extracting heat from the circulating oil mixture for progressively reducing the temperature of the circulating oil mixture, and introducing free excess charge which is net unipolar into the circulating oil mixture, said steps being continued at least until nucleation of dissolved wax takes place.

Another preferred method of performing the invention provides a method of promoting nucleation of wax dissolved in a hydrocarbon oil mixture, comprising the steps of introducing a quantity of said wax-containing hydrocarbon oil mixture diluted with a vaporizable oil solvent additive into a container vessel, continuously allowing said liquid additive to vaporize into a vapor space above the oil mixture in said container vessel, so as to progressively reduce the temperature of the oil mixture in the container vessel, introducing free excess charge which is net unipolar into a flow of make-up vaporizable liquid additive and continuously directing the charged make-up liquid additive through said vapor space and into contact with said quantity of oil mixture in the container vessel, said steps being continued at least until nucleation of dissolved wax takes place.

It is remarked that nucleation of dissolved solute will not necessarily occur at the same time for all the dissolved solute present. For example, dissolved wax may comprise different wax species which have slightly different nucleation or solidification temperatures under otherwise identical conditions. Therefore, wax species with higher solidification temperatures will tend to start nucleating first, but they will nevertheless provide growth sites at which other wax species may then start to nucleate. It is also pointed out that the solution may include a dispersed phase (solid or liquid) in addition to the solute. In that case, the introduction of free excess charge will not only bring about nucleation of the solute, but also agglomeration of the dispersed phase which can be separated from the solvent in much the same way as the particles or crystals developed from the nucleating solute.

BRIEF DESCRIPTION OF THE DRAWINGS

For a better understanding of the invention and to show how the same may be carried into effect, reference will now be made, by way of example, to the accompanying drawings, in which:

FIGS. 9 to 11 are graphs presenting further experimental data obtained with the apparatus of FIG. 1 (including settler), which shows the ability of a coarse (32 mesh) downstream filter/settler to be effective in removing wax when charge injection is used; and FIGS. 12 and 13 illustrate the crystal morphologies resulting from progressively cooling a lube oil/hexane mixture, initially containing dissolved wax, down to room temperature in the cases where there was no charge injection and where charge injection was effected throughout the cooling, respectively.

DESCRIPTION OF THE PREFERRED EMBODIMENTS

Figure 1:
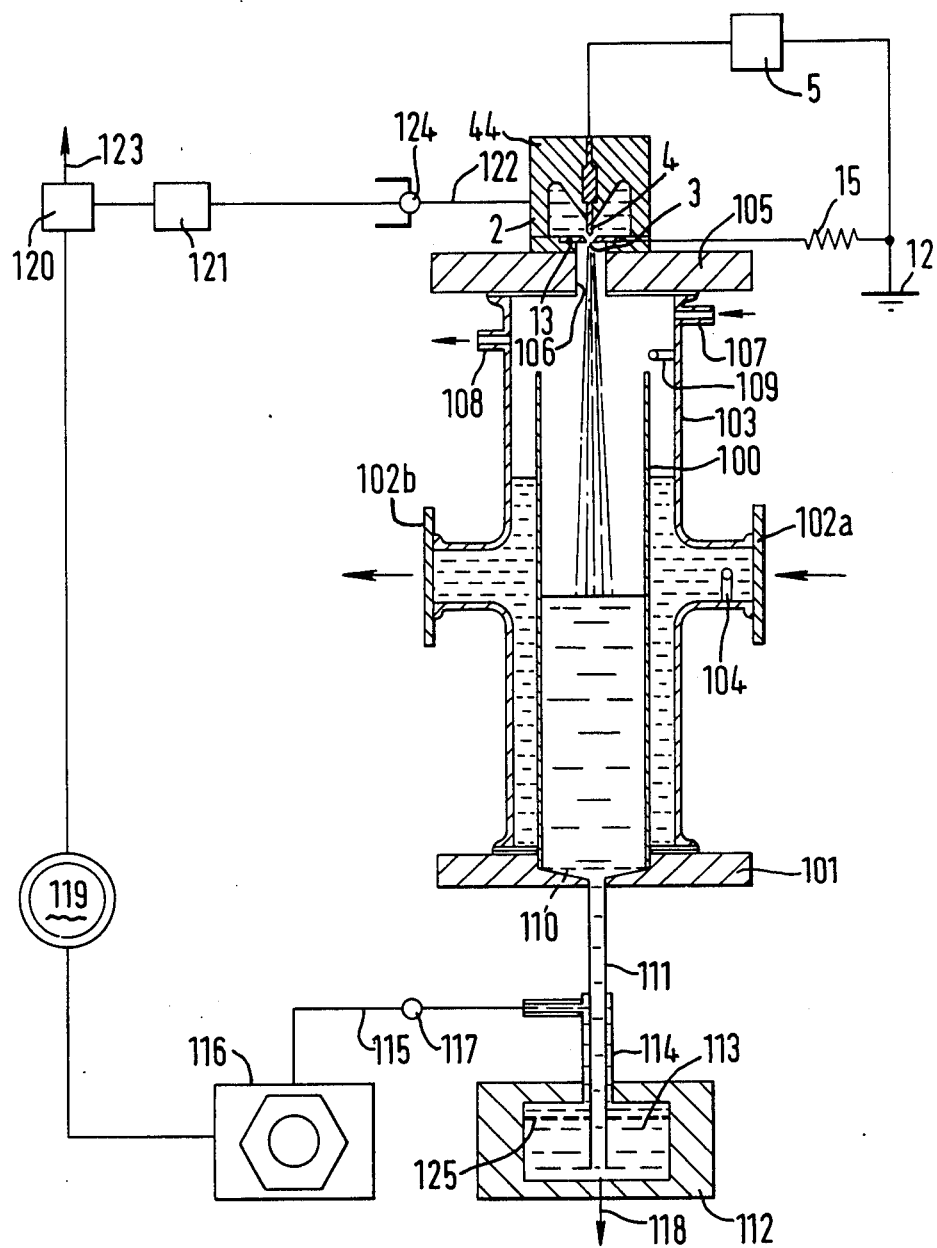
FIG. 1 represents an experimental form of wax separation apparatus in accordance with the invention.

An experimental wax separation apparatus is shown in FIG. 1 which is used to separate wax from raffinate-hexane mixtures, the wax being wholly or partially dissolved in the raffinate-hexane mixture. The apparatus comprises an open-topped, upright cylindrical separation vessel 100 supported on a base 101 and surrounded by an upright cooling jacket 103 having a cooling fluid inlet 102a and cooling fluid outlet 102b for circulating a cooling fluid, e.g. water, or, when sub-zero °C. temperatures are to be reached, any other suitable refrigerant, through a refrigeration unit (not shown) and the cooling jacket to reduce the temperature of the separation vessel. The bath temperature is monitored by a thermometer device 104. The cooling jacket 103 is closed off at the top by a cover 105 which forms an air-tight seal with the cooling jacket and a charge injector 44, which injects free excess electric charge which is positive or negative into the waxy raffinate-hexane mixture stream passing through the charge injector, is mounted on top of cover 105. A central opening 106 in cover 105 is positioned immediately below the exit orifice 3 of the charge injector so that a downwardly directed stream of charged hexane-diluted raffinate from the charge injector passes through the opening 106 in cover 105 and impinges onto a body of charged raffinate-hexane mixture in the separation vessel. An earthed grid electrode 110, indicated as a horizontal grid but which can take the form of other shapes and configurations, is positioned inside the separation vessel close to its bottom, and completes the electrical circuit of the charge injector.

The charge injector 44 may be constructed in accordance with the teaching of the aforesaid U.S. Pat. No. 4,255,777, (the contents of which are expressly incorporated herein by reference). Nevertheless, the charge injector 44 will now be briefly described. It essentially comprises an upright, suitably cylindrical, chamber 2 through which the waxy lube oil passes, having a bottom wall 13 with a central opening or orifice 3, and a sharply-pointed electrode 4 positioned inside the charge injector chamber and electrically connected to a high voltage power supply 5, the tip of the electrode 4 being located closely adjacent to, and in axial alignment with, the opening 3. The chamber bottom wall 13 serves as a second electrode which is maintained at a lower voltage, relative to earth, than pointed electrode 4, by means of a connection to earth 12, which can be a direct connection or, as shown, through a resistance element 15.

As shown, the cooling jacket may also be provided with a gas inlet and outlet, 107 and 108 respectively, for purging the enclosed space above the hexane-diluted raffinate in the separation vessel 100 and above the cooling fluid in the cooling jacket 103, so that all traces of air, which might otherwise present a risk of explosion or unwanted chemical reaction, are removed. Gas outlet 108 may be connected to an oxygen analyser which monitors for the presence of air or oxygen in the purge gas exhausted from the enclosed atmosphere in separation vessel 100 and cooling jacket 103. The gas pressure in this enclosed space can be monitored by a pressure gauge, diagrammatically indicated at 109.

A conduit 111 extends downwardly from the bottom of the separation vessel and conveys charged raffinate-hexane mixture from the separation vessel to a settler 112. The settler comprises a settling chamber 113 including a filter screen 125 (for example a 32 mesh metal screen) extending horizontally across the chamber. Samples of the mixture in the settling chamber 113 can be taken, using sample line 118. An outlet pipe 114, arranged coaxially around conduit 111, projects upwardly through the top wall of the settler and is connected by line 115 to a turbidity meter 116 which measures the turbidity of the raffinate-hexane mixture passing through it. A preferred form of turbidity meter is one which optically measures the scattering of incident radiation by the raffinate-hexane mixture in its optical field of view. The temperature of the mixture flowing in line 115 is monitored by temperature sensor 117 and closely corresponds with the temperature in the separation vessel 100.

A constant volume displacement pump 119 pumps raffinate-hexane mixture from the outlet side of the turbidity meter 116 to a gas separator 120 which separates entrained purge gas from the liquid mixture which then passes through a flow rate detector 121 in line 122 which is connected to the inlet of charge injector 44. Purge gas which has been separated from the liquid stream by the gas separator 120 is piped away along line 123 for recycling or discharge. The temperature and pressure of the raffinate-hexane mixture supplied to the charge injector 44 is monitored by temperature and pressure gauges at sampling point 124 in line 122.

In operation, a quantity of preheated raffinate to be treated for wax removal is introduced into the separation vessel, the raffinate being diluted with hexane. The experimental work to be described below was conducted with hexane as the oil-solvent, but it will be appreciated that other oil-solvents may be used instead, propane being a preferred diluent. Propane is advantageous in that it can be added in liquid form and then allowed to vaporize (for example after issuing into the separation vessel 100) so as to cool the propane-diluted raffinate mixture and reduce the cooling requirements of the refrigeration unit.

The pump 119 is then started up and the raffinate-hexane mixture circulates through the separation vessel 100, the settler 112 and back through the charge injector 44. The volumetric flow rate through the apparatus is determined by the pumping action of pump 119. As the liquid mixture flows through the charge injector, charge is injected into it and the charged liquid mixture impinges onto the top of the body of raffinate-hexane mixture in the separation vessel 100 and accumulates there. Initially, the raffinate-hexane mixture temperature is such that the wax which it contains is largely or wholly dissolved. There may in some instances additionally be a proportion of dispersed wax particles or crystals in the raffinate-hexane mixture. With the refrigeration unit switched on, the cooling fluid circulating through the cooling jacket progressively reduces the temperature in the separation vessel until nucleation of dissolved wax, assisted by the effect of the injected electric charge, occurs. Once nucleation has started, the nucleating wax provides sites which promote wax crystal formation and growth. The charge becomes attached to wax particles and crystals suspended in the separation vessel and an electrophoretic migration of wax particles is induced which results in wax particle agglomeration and particle size growth in the separation vessel, as well as alterations in the crystal morphology as compared with that which is produced in the absence of charge injection. The grid electrode 110 is believed to contribute to the wax particle growth and agglomeration by providing a conduction path to earth for the charge on charged wax particles and agglomerates contacting the grid electrode. These particles accordingly lose their charge and, therefore will agglomerate more readily with migrating charged particles encountering those uncharged particles. Some wax becomes deposited on the inner surface regions of the separation vessel or on the grid electrode 110, and some of the growing and agglomerating wax particles are swept out of the separation vessel 100 by the flow of raffinate-hexane liquid leaving the separation vessel at the bottom.

In the settler in which the residence time is comparatively long, grown wax particles start to settle under gravity and precipitate to form a mass of wax or a wax cake on the bottom of the settler. Other grown wax particles are drawn upwardly by the flow of raffinate-hexane mixture leaving the settler at the top and providing they have been grown to a sufficient size to be restrained by the filter screen 125, they are removed from the flow of raffinate-hexane mixture. Any wax particles which are small enough to pass through the filter screen will be recycled through the charge injector 44 and the whole process is continually repeated so that as time passes the proportion of wax in the raffinate-hexane mixture from the settler becomes lower and lower. When the wax content is sufficiently low as determined by the turbidity meter 116, the substantially wax-free raffinate-hexane mixture is discharged from the apparatus, using line 118, and the next batch to be treated is introduced, and so on.

It will of course be recognized that the residence time of the hexane-diluted raffinate in the separation vessel should be sufficiently long that adequate growth in wax particle size for at least a proportion of the wax particles leaving the separation vessel has been achieved such that either the wax particles and agglomerates will separate, by settling, from the raffinate-hexane mixture in the settler 112 or the filter screen 125 can filter the wax particles from the raffinate-hexane mixture. For a given mesh size for the filter screen and for a separation vessel of given dimensions filled to a particular level, the pump delivery will need to be chosen to achieve the desired growth in wax particle size in the separation vessel.

Some experimental work which has been conducted to demonstrate the effect of charge injection using the apparatus disclosed herein with reference to FIG. 1, is described below in the section headed EXAMPLES.

Figure 2:
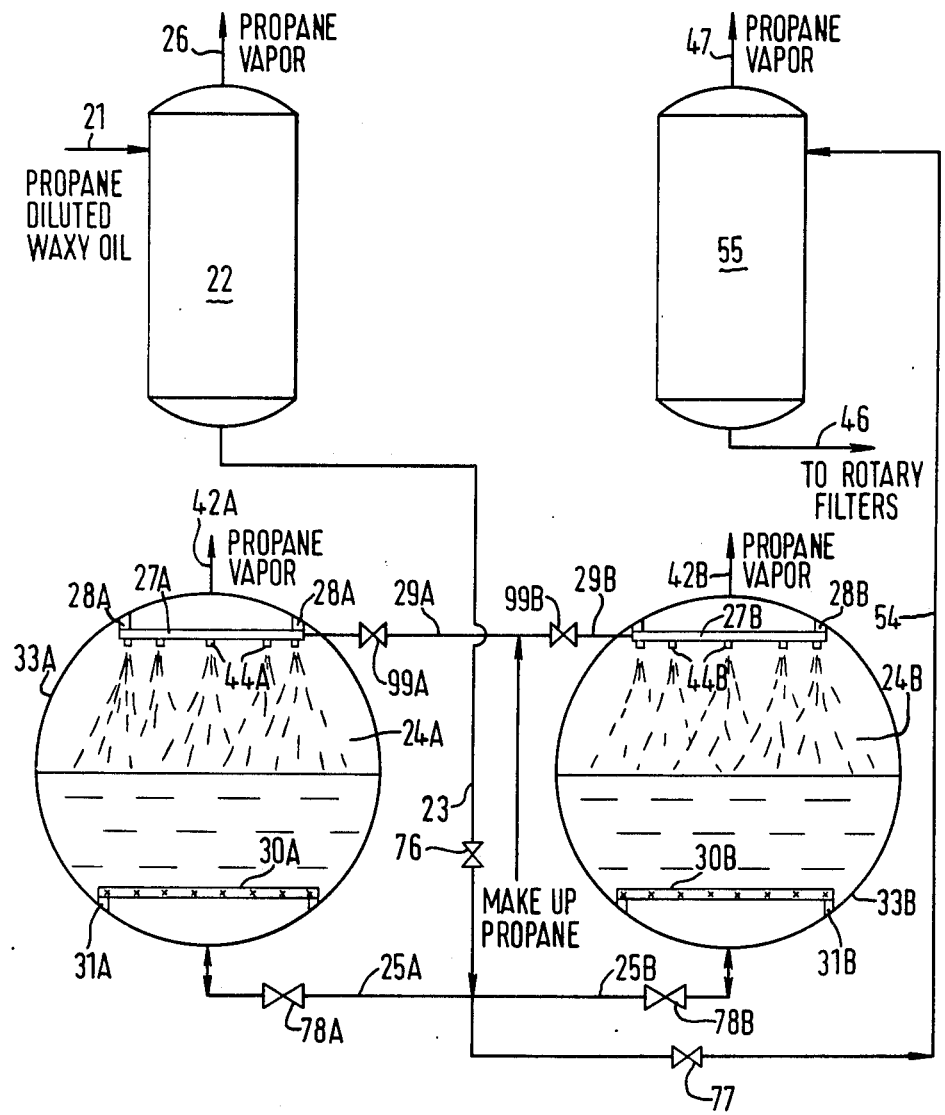
FIG. 2 is a schematic side view of a third embodiment employing batch chillers of essentially known construction, but modified to include electrical charge injectors.

Referring now to FIG. 2, there is shown, diagrammatically, one form of batch treatment plant which embodies a modification to a known kind of wax separation apparatus and represents a relatively inexpensive, simple and effective way of implementing the present invention. Liquid propane solvent at a temperature of typically 80° F. to 200° F. is added to waxy lube oil from tankage at a temperature of typically 140° F. to 180° F. and the propane-diluted oil feed is precooled in a precooler (not shown) to a temperature (about 80° F.) above the cloud point for the oil/solvent mixture (i.e., the temperature at which wax particles start to come out of solution). Therefore, all the wax in the oil is dissolved. The propane-diluted, precooled, waxy oil feed is conveyed along line 21 and introduced into a feed drum 22 in which a quantity of propane-diluted waxy oil is stored, from which propane-diluted waxy oil is fed to a minimum of two batch chillers. In the illustrated embodiment, just two bath chillers, 24A,24B are used. In embodiments having more than two chillers, the chillers are arranged into two groups with the chillers of each group interconnected. In this way, a batch of propane/waxy oil can be treated in one batch chiller (or group) while the other one is emptied and re-filled and vice versa so that in effect the facilities upstream and downstream of the batch chillers can be operated continuously. The following description applies to batch chiller 24A and its associated pipework and valves, but it will be appreciated that the description applies equally to the other batch chiller, 24B, and its associated equipment by substitution of the suffix "B" for "A".

Propane diluted waxy oil is fed from feed drum 22 along feed line 23 followed by fill/dump line 25A to batch chiller 24A. Some of the dissolved liquid propane in feed drum 22 vaporizes and propane vapor is conveyed away from the drum along line 26. Only a small temperature drop normally occurs in feed drum 22, in order that the temperature of the propane/waxy oil entering the batch chiller 24 remains near the cloud point of the oil/solvent mixture.

In this example, batch chiller 24A comprises a spherical container vessel 33A having an inlet connection at the bottom to which the fill/dump line 25A is connected. Alternatively, vessel 33A could be cylindrical in shape. The diameter of the container vessel is typically about 25 feet. Inside the container vessel in its top region is mounted an annular propane distributor ring or header 27A arranged in a horizontal plane. The header is supplied with dry liquid make-up propane by propane delivery line 29A, which includes a control valve 99A. The mountings for the header are very diagrammatically indicated by reference numeral 28A and may assume any convenient form. The header is provided on its underside at regularly spaced angular positions with internally screwthreaded openings into which, in the known wax separator, are fitted respective, externally screw-threaded, spray nozzles. However, in the present embodiment, each spray nozzle is replaced by a charge injector 44A which will be described in more detail hereinbelow with reference to FIG. 3. A propane vapor line 42A is connected to the top of the container vessel 33A.

Apart from the charge injectors 44A, the only other modification incorporated into the batch chiller 24A is that a grid electrode 30A is supported inside spherical container vessel 33 in its bottom region. The grid electrode 30A is connected to earth and completes the electrical circuit of the several charge injectors 44A. Specifically, electrical charge in the waxy oil/propane mixture in the container vessel 33A is collected by electrode 30A and conducted away to earth. Conveniently, the grid electrode is circular in shape, of small thickness and arranged in a horizontal position. Suitably, it can be constructed as a circular grating or gauze for example. The particular form which the grid electrode takes is not of any great significance. Again, the grid electrode is mounted in any appropriate way. For example, it may be supported on an annular internal shoulder 31A on the inside spherical surface of the container vessel 33A. Alternatively, the grid electrode could be vertically orientated, extending to just below or just above the level of the propane/oil mixture in the batch chiller. For a 25 foot diameter container vessel 33A, the final level of the mixture in the batch chiller 24A will typically be between about 1 foot above the center-plane of the container vessel and 3 feet above the lowest point in the vessel 33A. In all cases the final level must be sufficiently below the propane header 27A and charge injectors 44A, in order that they can direct or spray propane onto the propane/oil mixture in the container vessel 33A. In another embodiment, a criss-cross arrangement of vertical grids connected to earth could be employed, the grids serving to compartmentalize the lower region of the batch chiller interior.

Figure 3:
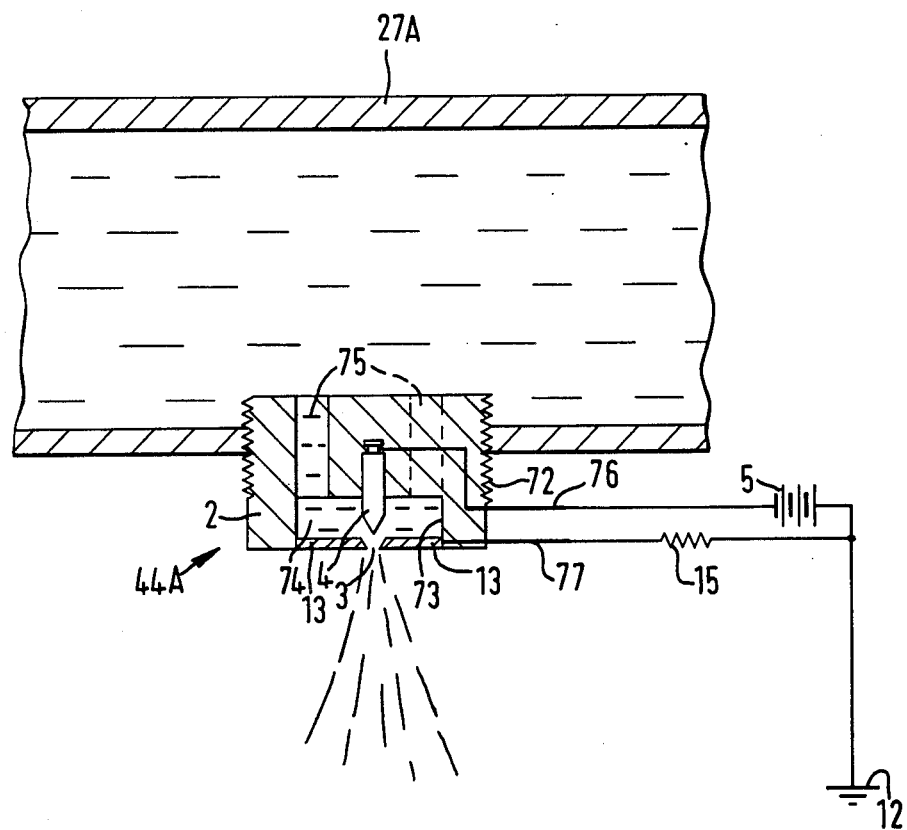
FIG. 3 is a detailed vertical sectional view through a charge injector incorporated in one of the batch chillers shown in FIG. 2.

Fill/dump line 25A not only serves to supply propane-diluted waxy oil to the batch chiller 24A, but it also is used for emptying the chiller. For this purpose fill/dump line 25A is connected to a further line 54 which conveys the contents of the batch chiller 24A to a filter feed drum 55 provided at the top with a propane vapor line 47. In order to control the filling and emptying of batch chillers 24A, 24B control valves need to be used, for example in lines 23, 25A and 54. In FIG. 3, these valves are shown at 76 and 77 respectively. The filter feed drum then supplies a slurry of wax particles, lube oil and dissolved propane along line 46 to one or more rotary filters which are not shown. Such rotary filters do not form part of the present invention and need not be further described herein but they are well known in the art. An example of a suitable rotary filter is described in U.S. Pat. No. 4,309,288 (Ryan et al), which is assigned to the present assignees.

Some of the dissolved liquid propane in feed drums 22, 55 and in the batch chillers 24A, 24B vaporizes to form a propane vapor atmosphere in those vessels. Propane vapor from those vessels 22, 55, 24A and 24B is conveyed along lines 26, 47, 42A, 42B, respectively, to a refrigeration unit in a propane handling circuit (not shown) which can be used to supply one or more of the propane requirements of the treatment plant, e.g. the liquid propane feed introduced into the waxy oil feed upstream of the precooler and the feed drum 22 and/or the supply of dry make-up propane to the batch chillers.

With reference now to FIG. 3, there is shown a vertical sectional detail through one of the charge injectors 44A mounted in the underside of the ring distributor or header 27A. In this Figure, reference numerals corresponding with those used in FIG. 1 denote the same or corresponding parts and therefore such parts will not be described again, except as concerns different features, where applicable. It will be seen in FIG. 3 that the opening in the header underside in which the charge injector 44 is mounted is internally screwthreaded, for normally receiving the externally screwthreaded propane nozzle of the typical known batch chiller. The charge injector comprises a body 2 of cylindrical shape formed with an externally screwthreaded portion 72 which is interengaged with the internal screwthread of the opening in the header wall underside. The body 2 comprises a cylindrical block of electrically insulative material in which a blind cylindrical recess 73 is formed in the lower region. The bottom wall 13 of the charge injector comprises a circular electrically conductive plate, with a central opening 3, which closes off the blind recess at the bottom to define an enclosed space 74 within charge injector body 2. This enclosed space communicates by means of a plurality of axial passageways 75, drilled in cylindrical block 2, with the inside of header 27. Conductor buses 76, 77 embedded in the material of block 2 are connected at one end to the pointed, high potential electrode 4 and to the plate electrode 13, respectively, and project at their other ends through the side wall of the charge injector body 2 where they are connected by electrical wiring to the negative terminal of high voltage power supply 5 and resistance element 15. Each charge injector 44B in header 27B of batch chiller 24B is identically constructed to charge injector 44A.

The operation of the wax separation plant will now be described. Initially, one batch chiller 24A is empty while a batch of lube oil/propane/wax slurry is being chilled in the other batch chiller 24B. The last batch of chilled lube oil/propane/wax slurry from batch chiller 24A has been transferred to feed tank 55 (for example by means of a pump in line 54, not shown for clarity, or by driving the batch out by pressurizing the vapor space in the upper region of batch chiller 24A with propane under pressure delivered by a compressor, also not shown for clarity), valve 99A is closed, valves 76, 77 and 78A are all shut, and a quantity of propane-diluted waxy oil is stored in feed tank 22. Then, valves 76 and 78A are opened and propane-diluted waxy oil from tank 22 is conveyed along lines 23 and 25A (for example by means of a pump (not shown)) or by pressure and gravity, and enters the batch chiller 24A at the bottom. At the same time, feed tank 22 is replenished with fresh propane-diluted waxy oil through line 21. When an appropriate quantity of the propane/oil mixture has been admitted to the batch chiller 24A, valves 76 and 77A are closed.

The next step in the batch treatment process is to supply water-free make-up propane to the header 27A. The propane passes through the charge injectors 44A of the header which inject charge into the propane at a controlled rate or intermittently. The charge injectors direct the charged propane downwardly through the propane vapor space in the batch chiller container vessel 33A and onto the mixture of propane-diluted waxy oil in the vessel where the charged propane mixes with the liquid mixture. At the same time, a proportion of the propane in the container vessel, which is under pressure, is caused to vaporize by gradually releasing pressurized propane vapor through line 42A. This vaporization produces a cooling effect which can be controlled by appropriately controlling the batch pressure in the batch chiller and volumetric flow rate of make-up propane supplied to the header 27A, to produce a gradual reducton in the temperature of the batch chiller. As the temperature approaches the cloud point and due to the reduced solubility of the wax in the propane/oil/wax mixture, the dissolved wax starts to nucleate and crystallize and form a precipitate or suspension in the oil/propane mixture. Furthermore, the electric charge introduced by the charged propane which is directed or sprayed into the batch chiller 24A becomes attached to the nucleating wax species and wax particles which are forming and at the same time causes an electric field to be induced in the cooling propane-diluted waxy oil. The electrophoretic effect arising through the interaction between the charged wax particles and the induced electric field causes wax particles to migrate within the oil/propane mixture and unite and grow to form larger wax particles. The process is continued until sufficiently large wax particles and crystals have been grown such that they can easily and effectively be separated from the remaining propane/oil mixture by the rotary filters. Some of the wax particles will adhere to the grid electrode 30A while others will deposit on the inner wall surfaces of the container vessel walls, but most of the wax will remain as a suspension or precipitate in the batch chiller. It will be appreciated that the wax crystal growth is brought about cumulatively by three effects, namely nucleation and formation of wax particles due to temperature reduction, the lower solubility of wax in the propane, and the electrophoretic effect produced by the injected charge.

Having completed the batch treatment in batch chiller 24A, the charge injectors 44A are switched off and the supply of propane to the header 27A shut off, and then the valves 78A and 77 are opened and the contents of the batch chiller 24A emptied, via line 25A and line 54, into feed tank 55, the former contents of feed tank 55 having previously been fed along line 46 to the rotary filters. Before batch chiller 24A is emptied, batch chiller 24B is filled and the above-described chilling cycle is repeated in batch chiller 24B. In each rotary filter, a wax cake is formed on the filter cloth and separated from the propane-diluted oil. The propane-diluted oil leaving the rotary filters is substantially wax-free and is then fed to a propane recovery unit which recovers the dissolved propane leaving lubricating oil which is substantially free of wax and propane.

By means of the very simple modification of the known batch chillers by replacing the spray nozzles by charge injectors and installing the grid electrode in the bottom of each batch chiller vessel, much more effective wax nucleation, followed by particle and crystal growth, can be obtained. Therefore, the factors which normally affect crystal size, namely rate of chilling, dilution ratio, dewaxing aid concentration, and level of agitation, may all become less critical and a substantial operating cost saving may be anticipated. Another advantage is that by using the same refrigeration conditions, the resulting wax particle size will be larger so that simpler downstream rotary filter devices can be used such as drum separators. In addition, dewaxing aids which are often used in batch chiller propane dewaxing are no longer necessary. Nucleation and agglomerating-type dewaxing aids account for approximately 20 to 30% of the controllable operating costs of conventional propane dewaxers, and therefore the incentives for eliminating their need is both large and achievable, using the wax separating plant described with reference to FIGS. 2 and 3.

EXAMPLES

As mentioned above, experiments were performed using the apparatus depicted in FIG. 1. These experiments will now be described with reference to FIGS. 4 to 11. In all the experiments, a mixture comprising 25% by weight of raffinate and 75% by weight of hexane dliuent was used. In each experiment, the raffinate/hexane mixture was introduced into the separation vessel and the bath or cooling jacket temperature as determined by thermometer device 104 was increased until (at a temperature of about 50° C.) the separation vessel temperature as detected by temperature sensor 117 indicated that the raffinate/hexane had reached the required initial temperature of about 40° C. This instant was taken to define the time t=0. The bath temperature was then continuously reduced by circulating the cooling fluid through the refrigerating unit. The separation vessel temperature did not start to fall until the bath temperature had decreased below the separation vessel temperature. The separation vessel temperature then fell fairly rapidly for a while but the temperature fall rate gradually reduced as the bath temperature approached the temperature of the refrigeration unit.

Immediately prior to starting to reduce the cooling jacket temperature, pump 119 and charge injector 44 were switched on. The charge injector voltage was approximately 60 nano amps at an applied voltage of about 3–4 kV. The flow rate through the charge injector was approximately 1 ml/sec. The numerical values given in the following figures for turbidity are based on arbitrary units but indicate the degree of optical extinction of white light by the raffinate/hexane mixture. Turbidity readings were taken at approximately 10 second intervals and the average turbidity values then computed for 1 minute intervals. For each of the experiments, as described below, two sets of data were obtained, one with the charge injector switched off throughout the entire cooling range and the other with the charge injector operating, in order to provide a comparison as between the effect of charge injection and no charge injection under otherwise the same operating conditions. In FIGS. 4 to 11, the date for the case of uncharged raffinate/hexane mixture (no charge injection) is denoted by curve U and for the experiment where the mixture is charged (charge injector operative), the data is presented by curve C.

Figure 4:
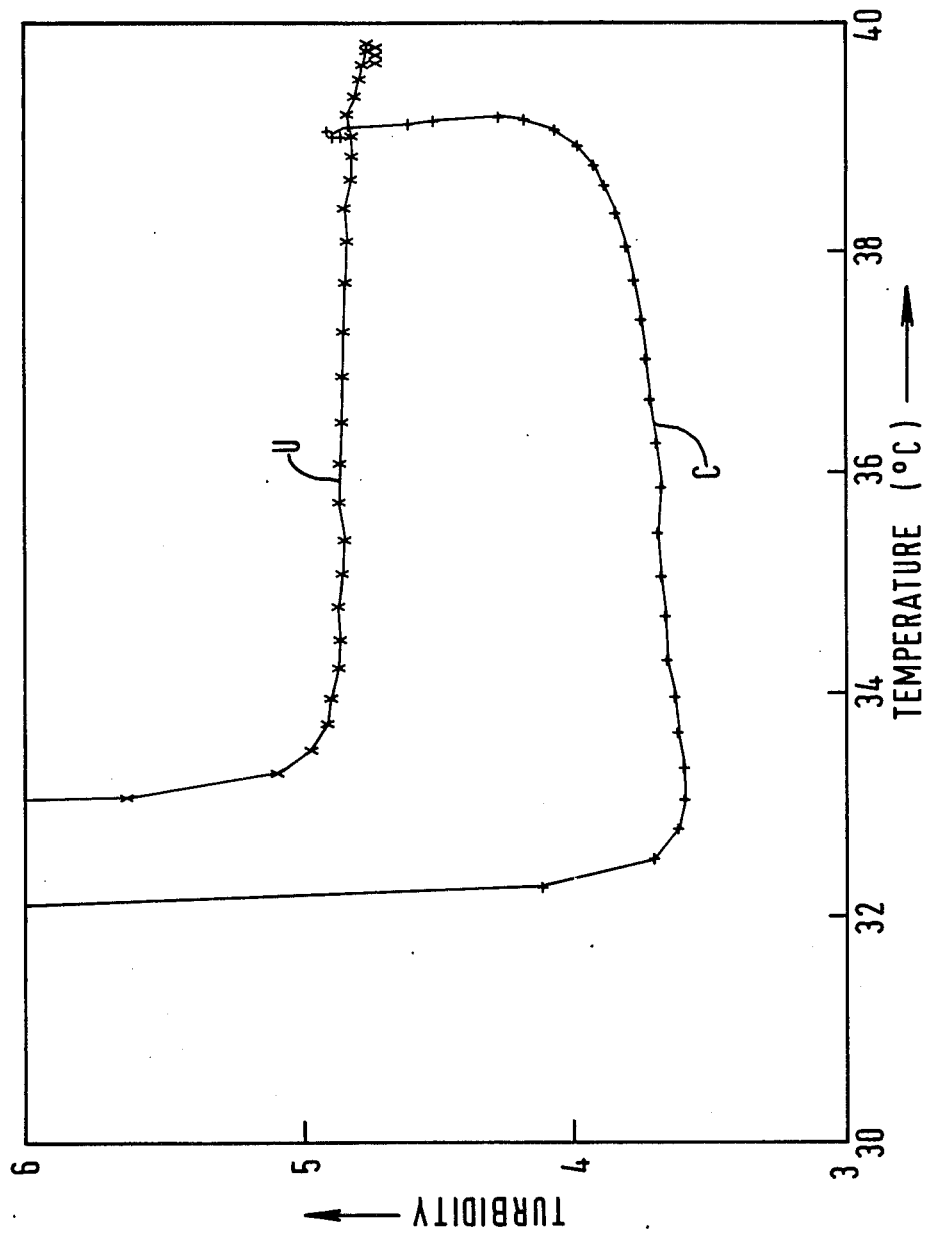
FIGS. 4 and 5 present experimental data, using the apparatus of FIG. 1, but with its settler omitted, illustrating removal of inclusions due to charge injection.

Referring to FIG. 4, this represents the turbidity readings obtained when cooling a sample of raffinate/hexane form an initial temperature of about 40° C. down to about 32° C., in an experiment in which no settler 112 was used and in which conduit 111 was connected directly to the inlet of the turbidity meter 116. In the case where no charge injection was applied, the turbidity date points (curve U), each representing the average of the several readings taken over each 1 minute interval, remained substantially constant (at a value just below 5) until the temperature had fallen to about 33.5° C., following which cooling down to about 33° C. produced a dramatic increase in the turbidity reading. The sharp increase in measured turbidity value was indicative of the onset of wax nucleation, followed by crystallization.

In the case where charge injection was applied, however (curve C), the turbidity value fell fairly steeply at around 39° C. and then remained relatively constant (between turbidity values of between about 3.5 and 4) until the temperature had fallen to about 32.5° C., whereupon further cooling brought a dramatic rise in the observed turbidity value.

It should be noted that in this experiment, because the settler 112 was omitted from the apparatus, there was no collector surface intentionally provided for the wax crystals and particles being formed in the raffinate/hexane mixture. However, the fall in the turbidity value at the temperature of about 39° C. is believed to be due to the fact that the charge injection was removing microscopic inclusions by deposition on the grid electrode 110, thereby leaving a raffinate/hexane mixture of lower turbidity value.

Figure 5:
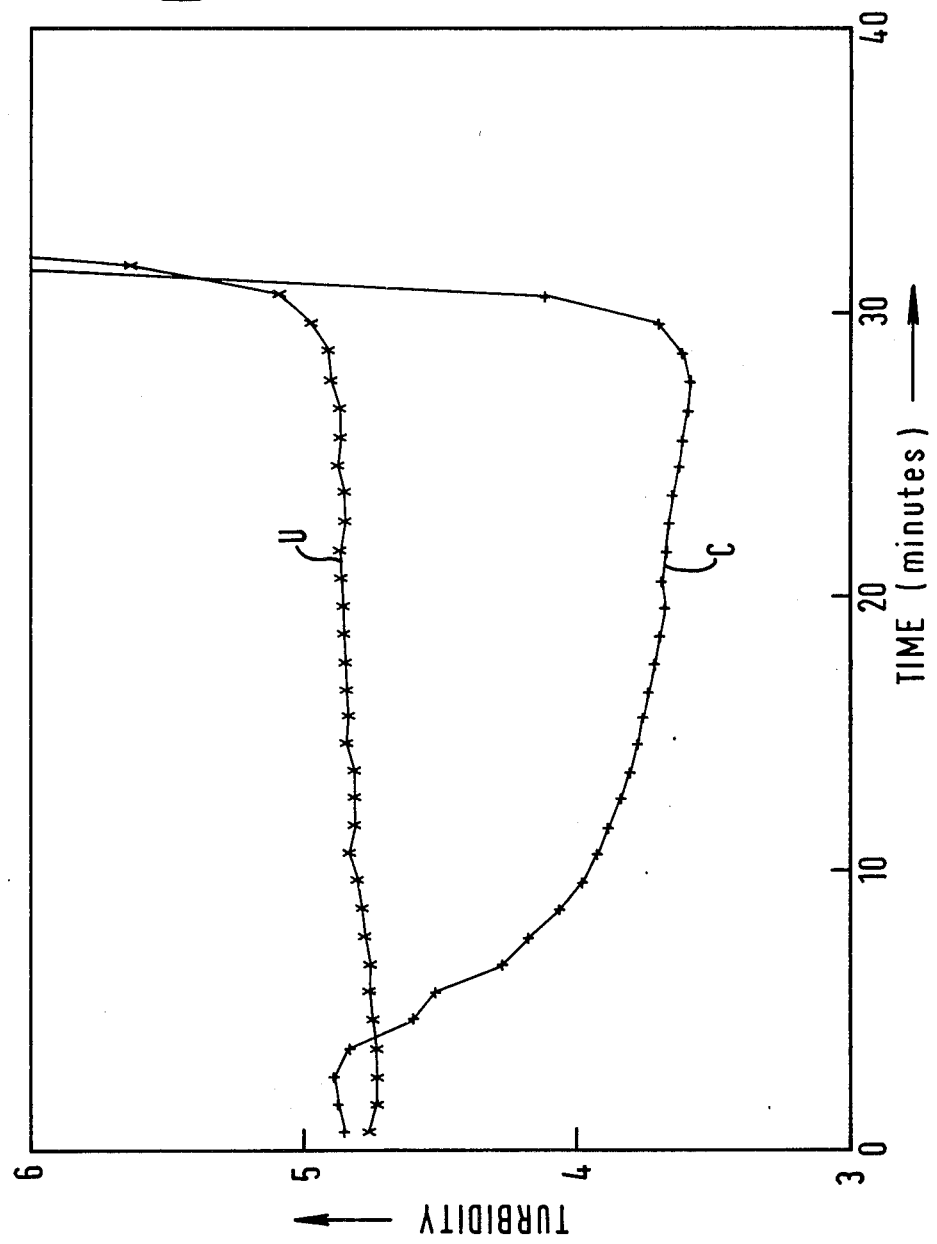

FIG. 5 presents essentially the same data as in FIG. 4 except that turbidity is plotted as a function of time. Because as explained above the initial temperature decrease of the separation vessel was comparatively small, followed by more rapid cooling and then more gradual cooling again, the observed turbidity value for the first ten minutes or so decreased comparatively slowly with time, in the case where the charge injector was operative, as shown in FIG. 5.

Figure 6:
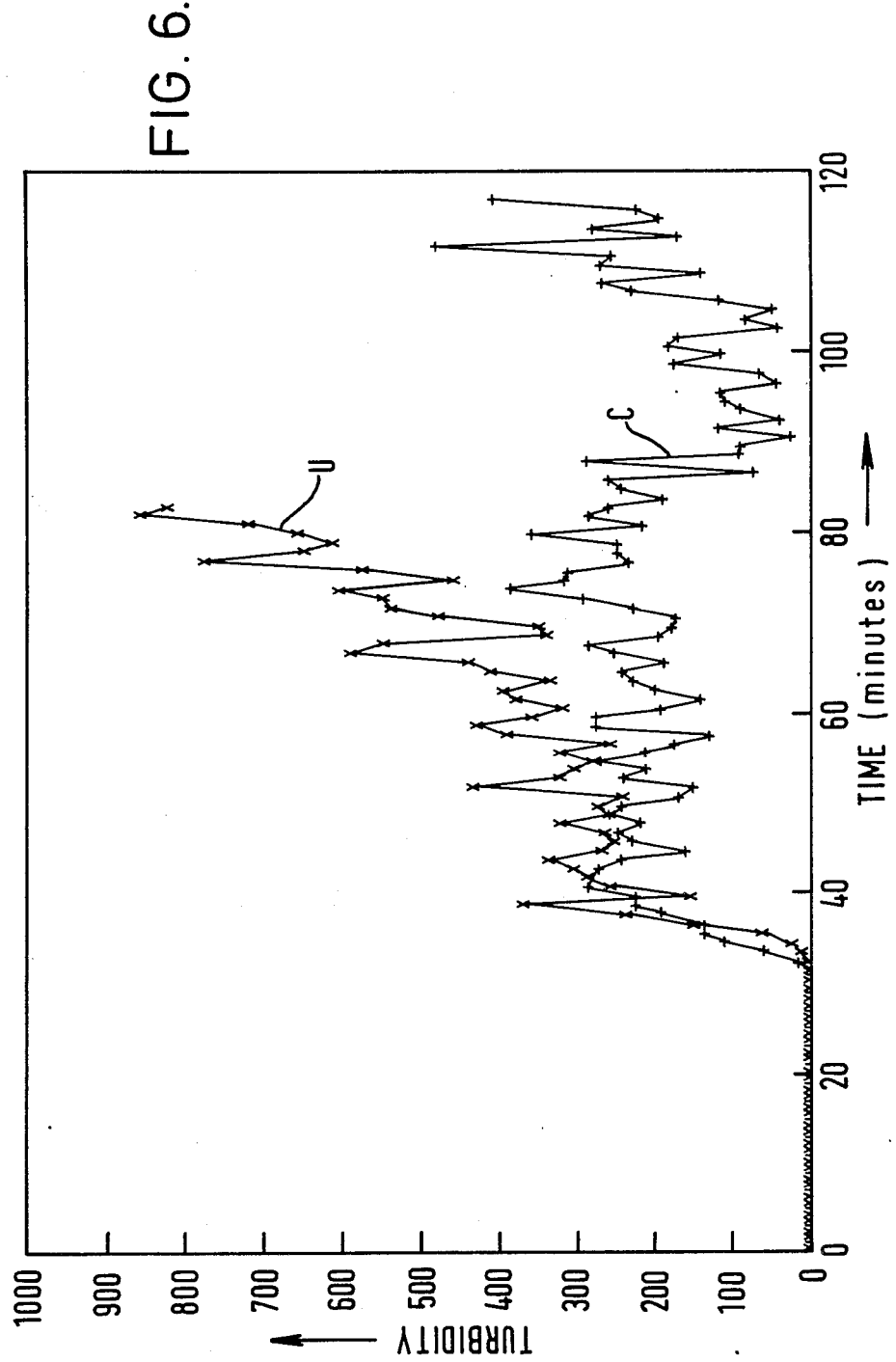
FIGS. 6 to 8 show further experimental data which demonstrate the effect of charge injection on growth and in-situ separation of wax crystals by virtue of the control and lowering of turbidity values as compared with the corresponding case where no charge injection is employed.

FIG. 6 presents the same data as FIG. 5, except that the turbidity was measured over a much longer time scale. It should be noted that the turbidity units presented in FIG. 6 are the same as those in FIG. 5 and that is why, on the scale of FIG. 6, the turbidity readings for both the case where charge was injected and charge was not injected appears to be close to 0 until about 30 minutes after the turbidity readings were first taken.

In the case where no charge injection was used, as the temperature of the raffinate/hexane mixture continued to be reduced, a high density of very small wax particles was observed in the raffinate/hexane mixture. The lower the temperature, so lower melting point wax species started to precipitate in the raffinate/hexane mixture, thereby increasing the turbidity value as indicated by the uncharged curve (U) rising with increased time. The sharp peaks and short-term fluctuations observed in the curve are believed to be due to the random distribution of the fine wax particles. At some instants, relatively more wax particles will happen to be in the optical field of view of the turbidity meter whereas at other times a lower density of wax particles will be present. The important feature to notice, however, is the trend towards increasing turbidity with reducing temperature (increasing time).

However, when a further sample was tested in the same way but with the charge injector switched on (curve C), it was observed that much larger wax crystals were formed than in the uncharged case, and the raffinate/hexane mixture was relatively clearer or less cloudy. The turbidity readings over the time span $t=30$ minutes up to $t=120$ minutes are consistent with this experimental observation. The turbidity readings fluctuated about a mean value of approximately 200 over this entire time span, as distinct from the rising trend in the case where no charge injection was applied (curve U). This is believed to be due to the fact that the raffinate/hexane mixture, when the charge injector was operating, was observed to be relatively clear. The relatively large peaks and short-term fluctuations in curve C can be explained by inhomogenities in the number density distribution of wax particles in the field of view of the turbidity meter.

It is remarked that, when charge injection was applied, some deposition of wax crystals on the grid electrode 110 was observed. Such wax deposition may have contributed to the lower observed turbidity values, but it is believed that such contribution was comparatively small because most of the wax crystals were observed to be continually recycled through the apparatus.

Figure 7:
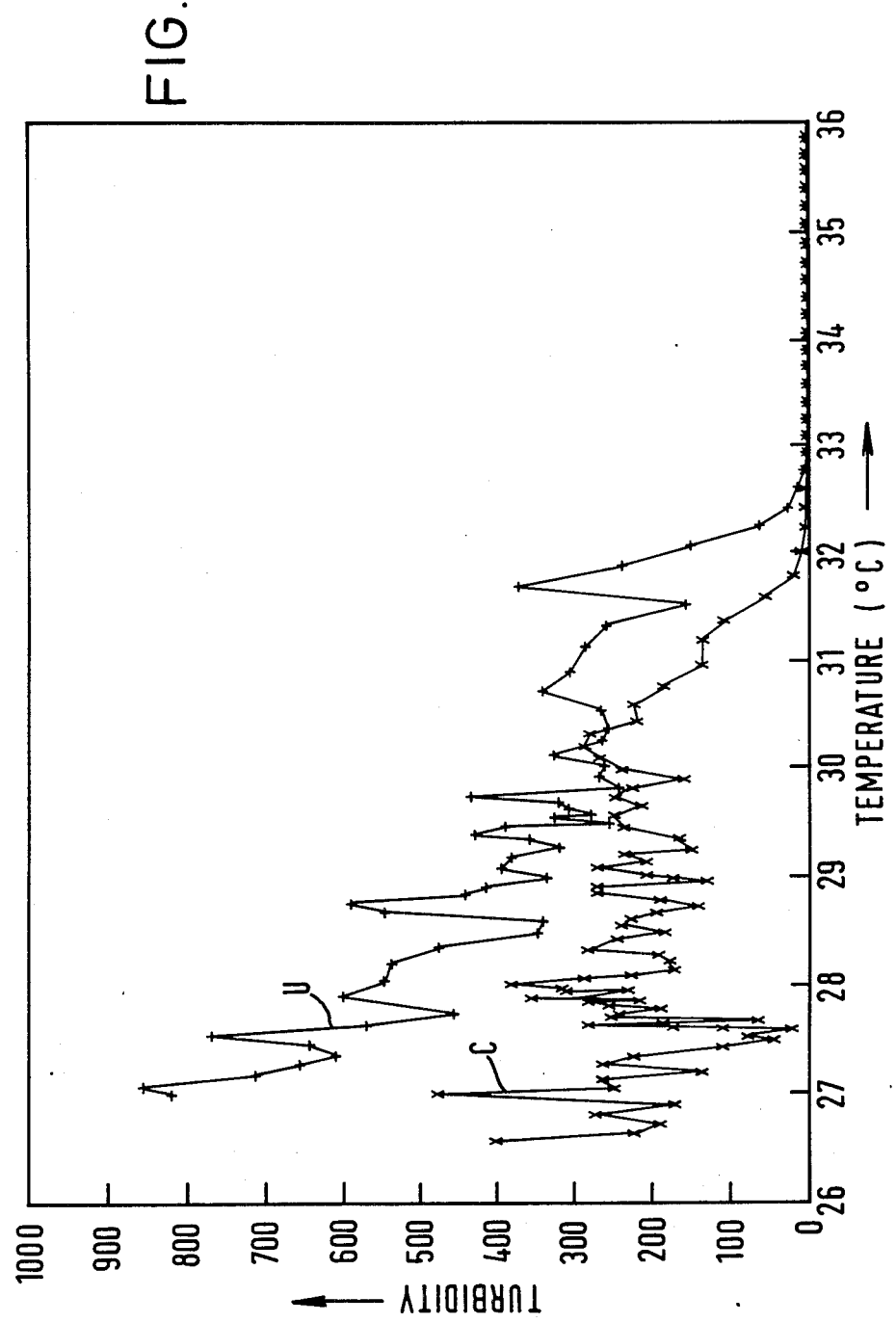

Referring now to FIG. 7, this presents the same data as in FIG. 6, except that turbidity is plotted as a function of separation vessel temperature as opposed to time. The same comments as were made above in connection with FIG. 6 apply equally in the case of FIG. 7.

Figure 8:
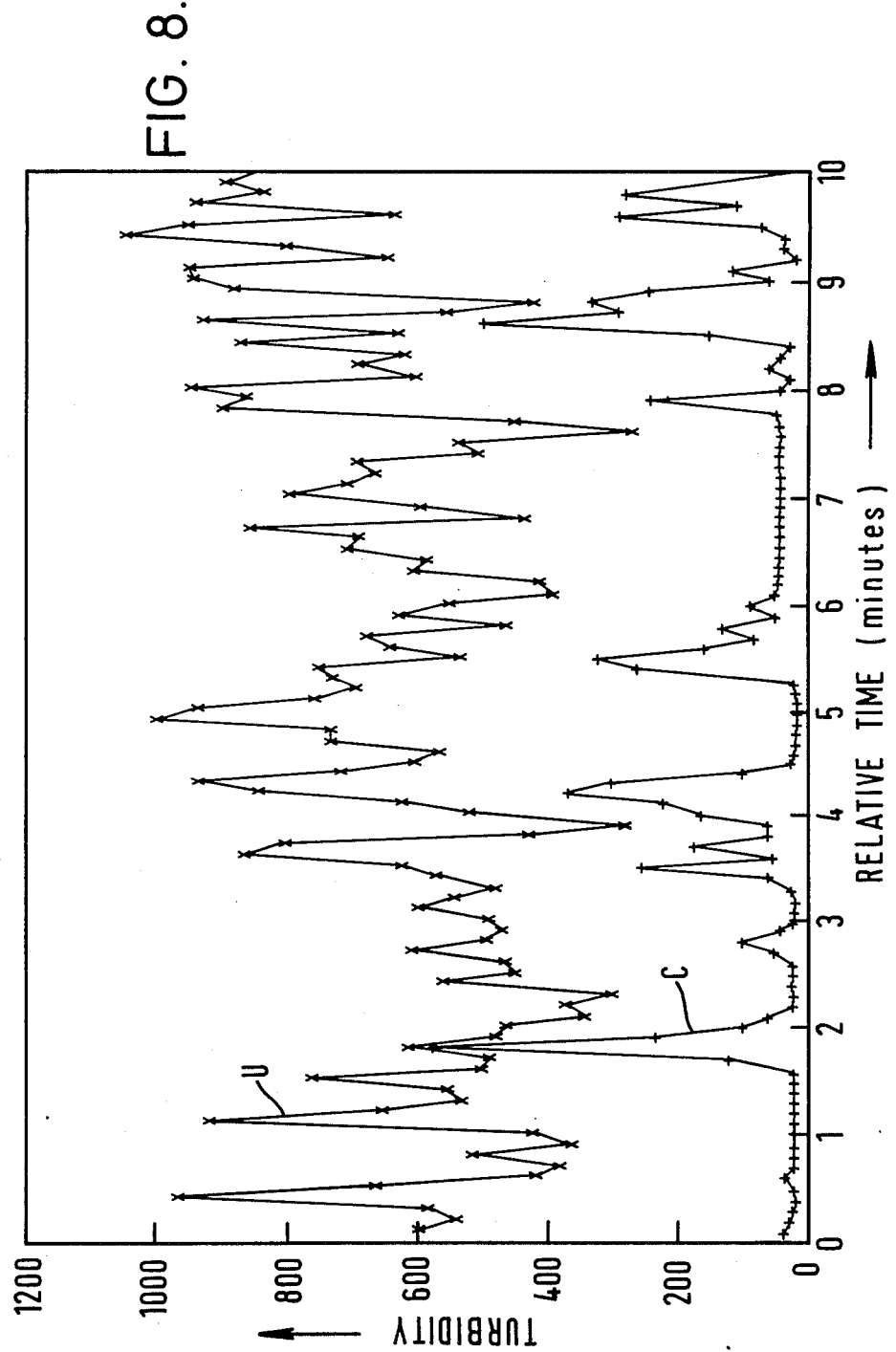
Figure 9:
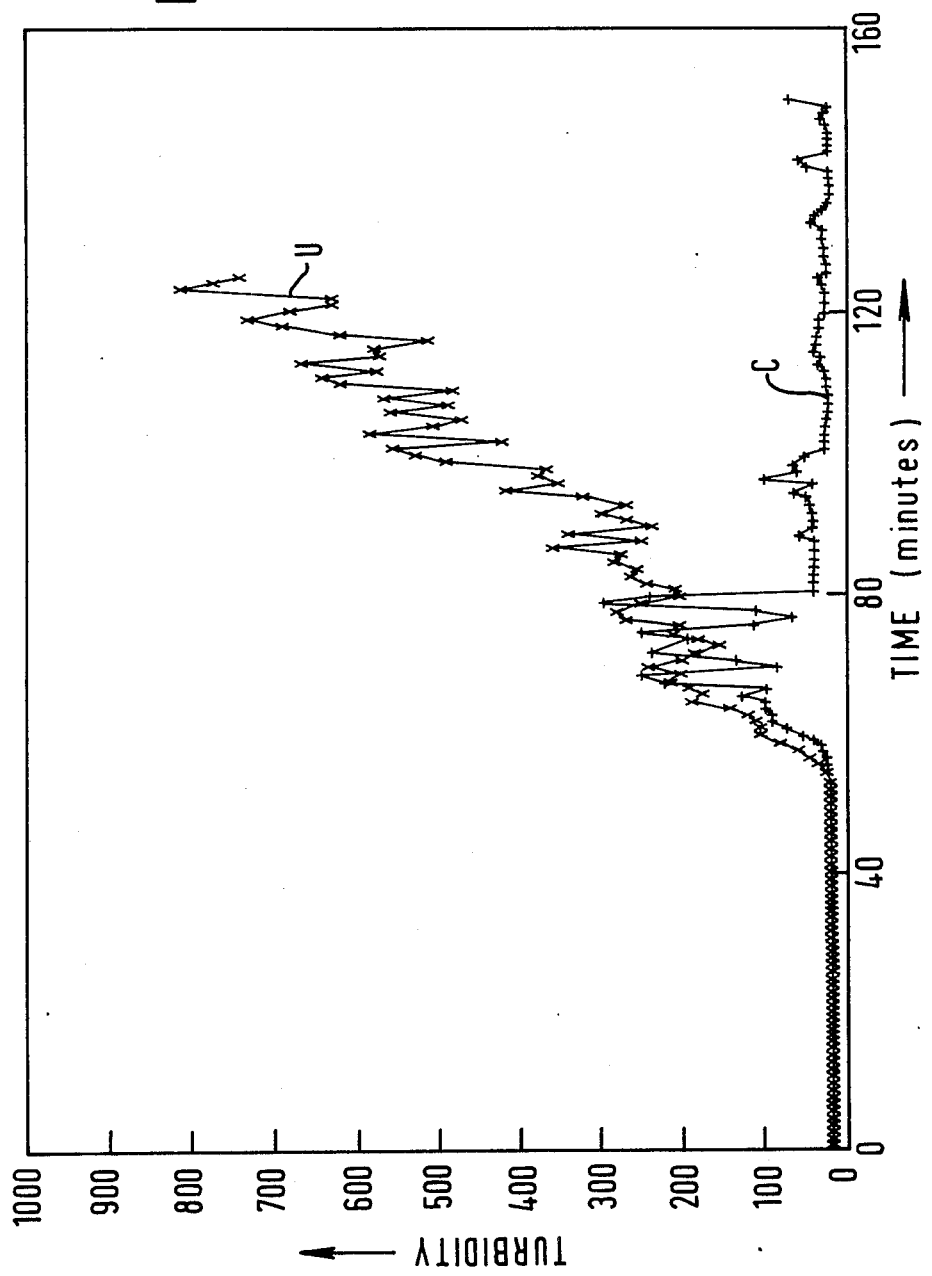

Turning now to FIG. 8, this presents the experimentally determined data for measured turbidity, for the cases of charge injection (C) and no charge injection (U), over a time span of 10 minutes, for which the mean separation vessel temperature was 27.6° C. It was remarked earlier that the data points plotted in FIGS. 4 to 7 were in fact mean values of several readings taken over 1 minute intervals. In FIG. 8, however, average turbidity readings of a 20 second time span are plotted. As explained previously, the big fluctuations in the case where no charge injection was applied are believed to be due to the random distribution of fine wax particles in the raffinate/hexane mixture. Similarly, where charge injection was applied, the sharp peaks represent the presence of large wax particles in the optical field of the turbidity meter. What, however, is of interest in FIG. 8 is that, apart from the presence of the sharp peaks, the measured turbidity value is almost uniform and also remarkably low (about 20 to 40 units). This uniform low value is believed to represent the turbidity of clarified raffinate/hexane mixture (substantially wax-free) without any wax particles being present in the field of view of the turbidity meter at the time that the readings concerned were taken. If any of the raffinate/hexane mixture examined were to have contained large numbers of small wax crystals in addition to the large wax crystals which were observed, then one would not have expected the observed turbidity value between peaks to have been either so low in value or of almost uniform magnitude. The implication, therefore, is that all the wax particles originally produced, of all sizes, were grown to form large wax crystals leaving substantially no small ones remaining.

Additional experiments were then run, this time with the settler 112 connected up as shown in FIG. 1 between the separation vessel 100 and the turbidity meter 116. With the charge injector inoperative, small quantities of wax were collected by filter screen 125 and the measured turbidity value was observed to rise with increasing time, as shown by curve U in FIG. 9. In particular, the data curve U in FIG. 9 corresponds fairly closely with the corresponding curve in FIG. 6, thereby indicating that the settler 112 is largely ineffective in the absence of injected charge. However, when the experiment was repeated with the charge injector switched on, wax crystals were observed to be restrained by the filter screen 125. Furthermore, the raffinate/hexane mixture was observed to become relatively clear during the experiment and this observation is wholly consistent with the measured turbidity over the entire time span of the experiment. The observed turbidity value from $t=80$ minutes to about $t=150$ minutes was very much lower than the corresponding data presented in FIG. 6 where no settler was used. It is interesting that in FIG. 9, between about $t=55$ minutes and $t=80$ minutes, the measured turbidity showed an increasing trend before falling significantly at about $t=80$ minutes, whereafter it remained at a comparatively low and constant value for the remainder of the experiment. Possibly, this rise is due to the formation and growth of wax crystals during that time but it was not until at time $t=80$ minutes that the wax crystals were big enough to be restrained by the filter screen 125.

Figure 10:
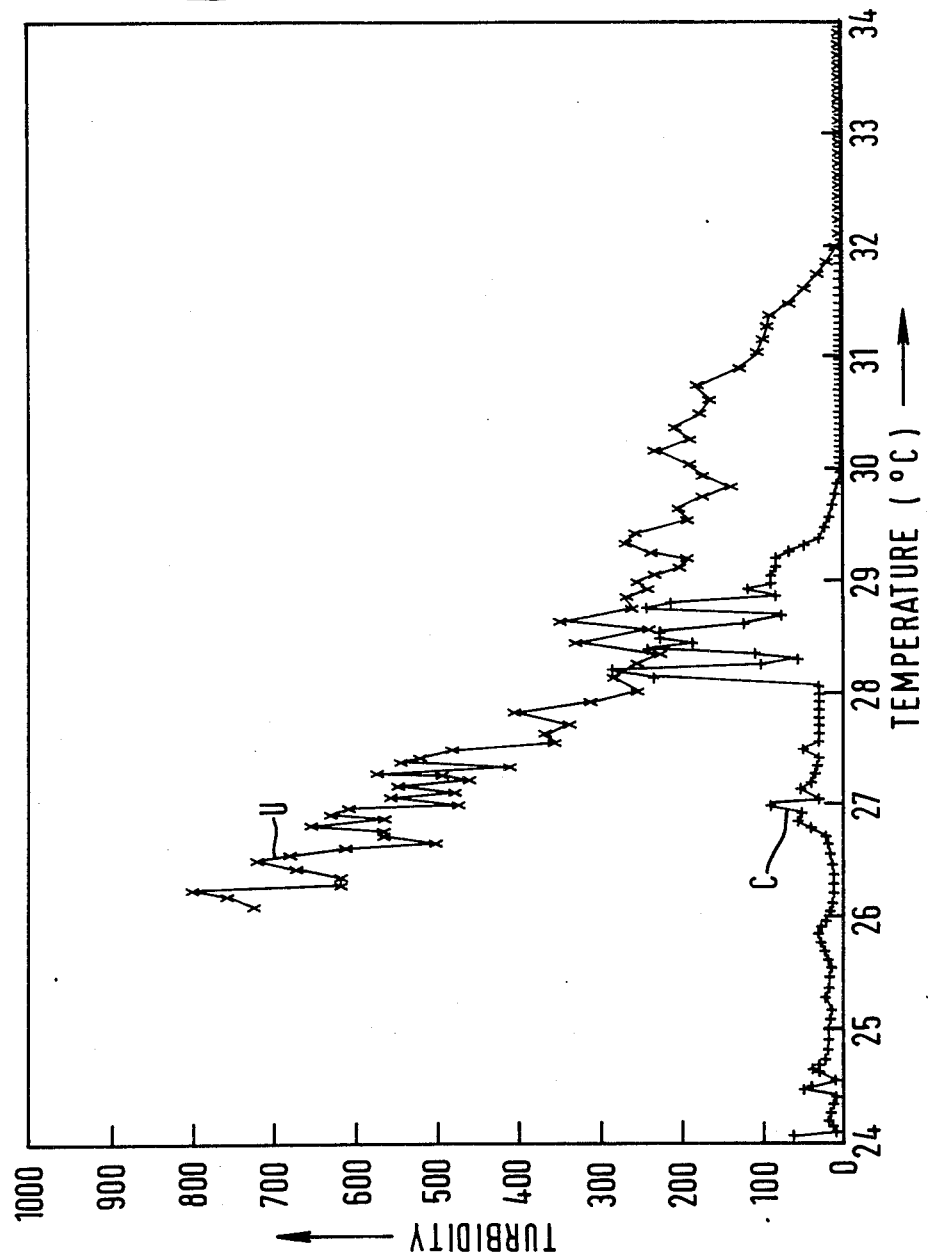

The data presented in FIGS. 10 and 11 correspond with that in FIGS. 7 and 8, respectively, except that for FIGS. 10 and 11, the settler 112 was used in the apparatus of FIG. 1. Corresponding comments to those made in connection with the data of FIG. 9 apply in the case of FIGS. 10 and 11 and therefore will not now be repeated. The important conclusion is that FIGS. 10 and 11 further illustrate how the filter screen 125 of the settler 112 is able to remove substantially all of the wax particles which have been grown by the charge injection process in the presence of hexane solvent. In particular, FIG. 8 indicates that no large wax particles were within the field of view of the turbidity meter.

In a further experiment, a waxy lube oil/hexane mixture was cooled from an initial temperature of about 40° C., at which substantially the entire wax content of the lube oil was present as dissolved wax, down to an ambient temperature of about 25° C., causing dissolved wax to nucleate and precipitate as wax crystals, taking the form of hexagonal-shaped platelets. No charge was injected into the oil/hexane mixture during the cooling. The resulting wax crystals were observed under a microscope and their configuration is depicted in the two views of FIG. 12, the upper view representing a plan view of the crystal platelets, designated 200, and the lower view being a side view. FIG. 12 shows that the wax crystals were observed to form groups of united hexagonal flat-plates which were stacked face-to-face. When a lube oil containing such wax particles is passed through a filter cloth, poor filtration is obtained due to the wax crystals clogging the fine openings in the filter cloth. This is believed to be due to the relatively "two-dimensional" shape of the individual groups of united wax crystals.

The experiment was repeated with charge injected continuously into an identical lube oil/hexane mixture over the entire cooling range (~40° C. to ~25° C.). The charge injector maintained a mean charge density in the lube/oil solvent mixture of about 0.01 Coulombs per cubic meter. The final wax crystals 200 were again observed to be hexagonal flat platelets, but in this case the platelets 200 were observed to tend to grow or unite directly in edge-to-face manner, as shown in FIG. 13. The inventors believe that this may result from charge-induced alignment of crystals prior to collisional growth or prior to fusion of adjacent crystals or by charge inducing a preferential growth outward from a crystal face rather than a crystal edge. The resulting largely three-dimensional shape will improve filtration by avoiding blockage of the filter openings. Furthermore, any subsequent washing of the filter cake on the filter cloth will be enhanced by the open structure of the wax crystal network.

It should be understood that the foregoing disclosure and description are only illustrative and explanatory of the invention. Various changes in and modifications to the components of the inventive apparatus and methods, as well as in the details of the illustrated apparatus and of the disclosed processes, may be made within the scope of the appended claims without departing from the spirit of the invention. For example, although two examples of batch electrical treatment have been disclosed herein, it is possible to adapt the treatment for continuous treatment. For example, the container vessel 100 in FIG. 1 could be provided with a surrounding refrigeration coil which results in a progressively decreasing temperature inside the vessel as the solution gets nearer to the bottom of the vessel. Solution to be treated would be delivered to the vessel and treated solution including the required nucleated solute or precipitate withdrawn from the vessel so as to provide sufficient residence time in the vessel for producing the necessary nucleation or precipitation.

Finally, reference is hereby directed to co-pending U.S. patent application Ser. Nos. 722,160, 722,162 and 722,163, all filed on the same day as the present.

What is claimed is:

1. A method of promoting nucleation of a solute, dissolved in a solvent to form a solution, so as to convert dissolved solute into a dispersed phase, comprising the steps of reducing the solubility for the solute and introducing free excess charge which is net unipolar into the solution, at least one of said steps being carried out from prior to nucleation taking place at least until nucleation of the solute in the charged solution takes place so as to produce said dispersed phase.

2. A method as claimed in claim 1, wherein the free excess charge is introduced into a body of said solution which is devoid of any collector surface inside said body of said solution, and wherein the introduced charge is allowed sufficient time to promote said nucleation of solute within said body of said solution.

3. A method as claimed in claim 2, wherein the free excess charge is introduced at least predominantly by electron emission.

4. A method as claimed in claim 2, wherein the free excess charge is introduced without producing ionic dissociation within the solution.

5. A method as claimed in claim 2, wherein said solute is dissolved wax and said solvent is a hydrocarbon oil mixture boiling in the lubricating oil range, and wherein said free excess charge is introduced by charge injection into a flow of said waxy oil mixture which is directed as a stream or spray through a gas or vapor space into said body of said waxy oil mixture, said gas or vapor space serving to minimise charge dissipation from said body of waxy oil mixture back to where the free charge introduction took place.

6. A method of promoting nucleation of a solute, dissolved in a solvent to form a solution, so as to convert dissolved solute into a dispersed phase, comprising the steps of reducing the solubility for the solute and introducing free excess charge which is net unipolar into the solution, the free excess charge being introduced from prior to nucleation taking place at least until nucleation of the solute in the charged solution takes place so as to produce said dispersed phase.

7. A method as claimed in claim 6, wherein both steps are carried out simultaneously for the duration for which the method is performed.

8. A method as claimed in claim 6, wherein the method is carried out for a sufficient duration, so as to convert the solute into a dispersion of precipitated particles in the solvent.

9. A method as claimed in claim 6, wherein the solubility for the solute is reduced by cooling the solution.

10. A method as claimed in claim 9, wherein the cooling is effected, at least in part, by indirect heat exchange with a cooling medium.

11. A method as claimed in claim 6, wherein a liquid additive is added to the solution to form an admixture and the admixture is cooled, said liquid additive being such as to dissolve the solvent preferentially so as to promote nucleation of the solute as the admixture is cooled.

12. A method as claimed in claim 11, wherein said liquid additive is allowed to vaporize from the liquid additive/solution admixture so as to cool the admixture.

13. A method as claimed in claim 6, wherein a liquid additive is added to the solution to form an admixture, said liquid additive being such as to preferentially combine, physically or chemically, with the solute while providing an affinity for free excess charge.

14. A method as claimed in claim 13 for promoting nucleation of wax dissolved in a hydrocarbon oil mixture boiling in the lubricating oil range, wherein said liquid additive comprises a high molecular weight hydrocarbon containing an amine group.

15. A method as claimed in claim 6, wherein said solute is a polar solute and said solvent is a non-polar solvent.

16. A method as claimed in claim 6, for promoting nucleation of wax, dissolved in a hydrocarbon oil mixture boiling in the lubricating oil range, so as to convert dissolved wax into wax particles in the oil mixture, wherein a first oil solvent liquid is added to the waxy oil mixture to form an admixture, the admixture is cooled to the cloud point of the admixture in the absence of any introduced free excess charge, and then the free excess charge is introduced into said admixture, at least until nucleation of the dissolved wax takes place to convert dissolved wax into wax particles in the admixture, whereafter a second oil solvent liquid is added to the admixture, said second oil solvent liquid being such as to reduce the solubility of the admixture to wax.

17. A method as claimed in claim 6, wherein said free excess charge is introduced into the solution by charge injection.

18. A method as claimed in claim 17, wherein said free excess charge is introduced by field emission into (a stream of) said solution which is then added to a body of the said solution, and wherein the charge in said body of the said solution is allowed sufficient time to promote said nucleation of the solute.

19. A method as claimed in claim 18, wherein the charged solution is directed as a stream or spray through a gas or vapor space before entering said body of said solution, to minimise charge dissipation from said body of said solution back to where the field emission took place.

20. A method as claimed in claim 17, wherein said free excess charge is introduced into a carrier liquid which itself is added to a body of said solution, said carrier liquid being both chemically non-reactive with the said solution and recoverable therefrom.

21. A method as claimed in claim 19, wherein said carrier liquid is directed as a charged spray or stream through a gas or vapor space before entering said body of said solution, so as to minimise charge dissipation from said body of said solution back to where the free charge introduction took place.

22. A method as claimed in claim 21, wherein said carrier liquid is such as to tend to displace the solute and promote nucleation of the solute.

23. A method as claimed in claim 6, wherein the solution is recycled around a closed circuit and wherein free excess charge is introduced into the circulating solution whilst the circulating solution is continuously subjected to cooling.

24. A method as claimed in claim 6, wherein a given quantity of said solution is introduced into a container vessel and the vessel temperature is reduced while free excess charge is added to the solution in the vessel.

25. A method as claimed in claim 24 wherein charge is removed from charged nucleating species and particles encountering a grid electrode, such removal being effected by a conductive path between the grid electrode and earth.

26. A method as claimed in claim 24, wherein said oil solvent liquid is a vaporizable liquid which is allowed to vaporize from the oil mixture so as to cool the wax-containing oil mixture.

27. A method of promoting nucleation of wax, dissolved in a hydrocarbon oil mixture boiling in the lubricating oil range, so as to convert dissolved wax into wax particles in the oil mixture, comprising the steps of introducing free excess charge which is net unipolar into the wax-containing oil mixture and reducing the solubility for the wax in the oil mixture, at least one of said steps being carried out from prior to nucleation taking place at least until nucleation of dissolved wax in the charged wax-containing oil mixture takes place so as to convert dissolved wax into wax particles in the oil mixture.

28. A method of promoting nucleation of wax, dissolved in a hydrocarbon oil mixture boiling in the lubricating oil range, so as to convert dissolved wax into wax particles in the oil mixture, comprising the steps of reducing the solubility for the wax and introducing free excess charge which is net unipolar into the wax-containing oil mixture, the free excess charge being introduced from prior to nucleation taking place at least until nucleation of dissolved wax in the charged wax-containing oil mixture takes place so as to convert dissolved wax into wax particles in the oil mixture.

29. A method as claimed in claim 28, wherein the solubility for the wax is reduced by cooling the wax-containing oil mixture.

30. A method as claimed in claim 29, wherein both steps are carried out continuously and simultaneously, the cooling step producing a progressive reduction in the temperature of the oil mixture.

31. A method as claimed in claim 24, wherein said cooling is effected, at least in part, by indirect heat exchange with a cooling medium.

32. A method as claimed in claim 28, wherein said one step is continued to a sufficient extent that nucleation leads to formation and agglomeration of wax particles for separation from the hydrocarbon oil mixture.

33. A method as claimed in claim 32, comprising the further step of allowing the wax particle-laden oil mixture to settle so that wax particles tend to separate from the oil mixture, and withdrawing oil mixture from a region in the settled oil mixture which is substantially wax-free.

34. A method as claimed in claim 33, comprising the further step of filtering the withdrawn oil mixture.

35. A method as claimed in claim 32, comprising the further step of filtering the wax particle-laden oil mixture.

36. A method as claimed in claim 28, wherein an oil solvent, wax anti-solvent liquid is added to the hydrocarbon oil mixture for promoting nucleation of the dissolved wax.

37. A method as claimed in claim 36, wherein said oil solvent liquid is an alkane with molecular weight between 16 and 114.

38. A method as claimed in claim 36, wherein said oil solvent is an alkene with molecular weight between 16 and 114.

39. A method as claimed in claim 36, wherein said oil solvent has electrical conductivity less than $10^{-8}$ (ohm-meter)$^{-1}$.

40. A method as claimed in claim 36, wherein said oil solvent liquid is liquified propane.

41. A method as claimed in claim 28, wherein said free excess charge is introduced into the oil mixture by charge injection.

42. A method as claimed in claim 41, wherein the free excess charge is introduced by field emission into said oil mixture and the charged oil mixture is directed as a stream or spray through a gas or vapor space and added to a body of said oil mixture, for minimising charge dissipation from said body of said oil mixture back to where the free charge introduction took place.

43. A method as claimed in claim 41, wherein said free excess charge is introduced into an oil solvent liquid which itself is directed as a charged stream or spray through a gas or vapor space and added to a body of said oil mixture, for minimising charge dissipation from said body of said oil mixture back to where the free charge introduction took place.

44. A method of promoting nucleation of wax, dissolved in a hydrocarbon oil mixture boiling in the lubricating oil range, so as to convert dissolved wax into wax particles in the oil mixture, comprising the steps of recycling a quantity of said oil mixture around a closed circuit, continuously extracting heat from the circulating oil mixture for progressively reducing the temperature of the circulating oil mixture, and introducing free excess charge which is net unipolar into the circulating oil mixture, said steps being continued at least until nucleation of dissolved wax in the charged oil mixture takes place so as to convert dissolved wax into wax particles in the oil mixture.

45. A method according to claim 44, wherein the steps are continued until nucleation leads to formation and agglomertion of wax particles, and further comprising the step of continuously filtering the circulating oil mixture to separate wax particles from the oil mixture.

46. A method as claimed in claim 45, wherein said filtering comprises gravity settling in combination with filtration through a filter screen.

47. A method as claimed in claim 44, wherein heat is continuously extracted by indirect heat exchange with a cooling medium.

48. A method of promoting nucleation of wax dissolved in a hydrocarbon oil mixture, so as to convert dissolved wax into wax particles in the oil mixture, comprising the steps of introducing a quantity of said wax-containing hydrocarbon oil mixture diluted with a vaporizable oil solvent liquid additive into a container vessel, continuously allowing said liquid additive to vaporize into a vapor space above the oil mixture in said container vessel, so as to progressively reduce the temperature of the oil mixture in the container vessel, continuously introducing free excess charge which is net unipolar into a flow of make-up vaporizable liquid additive and continuously directing the charged make-up liquid additive through said vapor space and into contact with said quantity of oil mixture in the container vessel, said steps being continued at least until nucleation of dissolved wax in the charged admixture of oil mixture and vaporizable liquid additive in the container vessel takes place to convert dissolved wax into wax particles in the oil mixture.

49. A method of precipitating wax dissolved in a hydrocarbon oil mixture boiling in the lubricating oil range, to form open structures of wax crystals in approximately edge-to-face orientation, comprising the steps of reducing the solubility for the wax and introducing free excess charge which is net unipolar into the oil mixture, at least one of said steps being carried out until nucleation of dissolved wax in the charged wax-containing oil mixture takes place and at least one of said steps being carried out, after said nucleation has occurred, until was crystals have formed into said open structures.

50. A method of promoting nucleation of a solute, dissolved in a solvent to form a solution, so as to convert dissolved solute into a dispersed phase, said method comprising the steps of:
 (1) reducing the solubility for the solute; and
 (2) introducing free charge that is net unipolar into the solution, at least predominantly by electron emission which causes the oil solvent to act as a medium through which volumetric distribution of the introduced charge takes place;
 at least one of said steps being carried out on a body of said solution from prior to nucleation taking place at least until nucleation of the solute in the charged solution takes place, said body of charged solution being devoid of any collector surface areas disposed within said body of solution, there being a sufficient excess of free charge introduced such that the volumetric charge distribution causes said nucleation of solute to occur so as to produce said dispersed phase.

* * * * *

UNITED STATES PATENT AND TRADEMARK OFFICE
CERTIFICATE OF CORRECTION

PATENT NO. : 4,622,119

DATED : November 11, 1986

INVENTOR(S) : Douglas G. Ryan, Anthony E. Cerkanowicz, Irving D. Crane, Brian P. Flannery, Robert J. L. Chimenti It is certified that error appears in the above-identified patent and that said Letters Patent is hereby corrected as shown below:

Title page:

Item [19] should read --Ryan et al--.

INVENTOR(S): Douglas G. Ryan, Anthony E. Cerkanowicz,

Irving D. Crane, Brian P. Flannery,

Robert J. L. Chimenti

Signed and Sealed this

Seventeenth Day of November, 1987

Attest:

DONALD J. QUIGG

Attesting Officer

Commissioner of Patents and Trademarks